(12) United States Patent
Enoch, III et al.

(10) Patent No.: US 8,057,606 B2
(45) Date of Patent: Nov. 15, 2011

(54) AQUARIUM CLEANING DEVICE WITH SELECTABLE SECONDARY CLEANING ELEMENT

(75) Inventors: Duard W. Enoch, III, Santa Barbara, CA (US); Harry Linden, Santa Barbara, CA (US)

(73) Assignee: Duard W. Enoch, III, Santa Barbara, CA (US)

( * ) Notice: Subject to any disclaimer, the term of this patent is extended or adjusted under 35 U.S.C. 154(b) by 375 days.

(21) Appl. No.: 12/483,947

(22) Filed: Jun. 12, 2009

(65) Prior Publication Data

US 2010/0083983 A1   Apr. 8, 2010

Related U.S. Application Data

(60) Provisional application No. 61/103,809, filed on Oct. 8, 2008.

(51) Int. Cl.
| | |
|---|---|
| B08B 9/087 | (2006.01) |
| B08B 11/04 | (2006.01) |
| B08B 1/00 | (2006.01) |
| A47L 1/09 | (2006.01) |
| A47L 1/15 | (2006.01) |

(52) U.S. Cl. ....... 134/6; 15/143.1; 15/220.2; 15/236.01; 15/246.5; 15/250.001; 15/250.28; 119/264

(58) Field of Classification Search ..... 134/6; 15/143.1, 15/214, 220.1, 220.2, 236.01, 236.02, 245, 15/246.5, 250.001, 250.11, 250.14, 250.28, 15/250.29; 119/264

See application file for complete search history.

(56) References Cited

U.S. PATENT DOCUMENTS

| | | |
|---|---|---|
| 3,208,090 A | 9/1965 | Roesel |
| 3,600,737 A | 8/1971 | Shore |
| 3,759,621 A | 9/1973 | De Carlo |
| 4,921,614 A | 5/1990 | Frickman et al. |
| 4,955,924 A | 9/1990 | Gorman |
| 4,977,637 A | 12/1990 | Demers |
| 5,988,109 A | 11/1999 | Rofen |
| 6,206,978 B1 | 3/2001 | Tsui |
| 6,634,052 B2 | 10/2003 | Hanson |
| 6,865,771 B2 | 3/2005 | Hanson |
| 7,313,840 B2 | 1/2008 | Watkins |
| 7,313,841 B2 | 1/2008 | Huang |
| 2006/0174840 A1 | 8/2006 | Rafailovich |
| 2008/0105211 A1 | 5/2008 | Deng |
| 2008/0163444 A1 | 7/2008 | Schwartz |

*Primary Examiner* — Michael Kornakov
*Assistant Examiner* — Natasha Campbell
(74) *Attorney, Agent, or Firm* — Felix L. Fischer

(57) ABSTRACT

A glass cleaning device employs an inner component having a body with an associated first cleaning element and a second movable portion positionable from a first to second position, the second portion associated with a second cleaning element. A support magnet is carried within the body and at least one magnetic element is carried in the second movable portion. An outer component provides a handle for manipulation by a user with a first magnetic element carried within the handle for operable engagement of the support magnetic in the inner component to draw the body into contact with an inner surface of an aquarium wall to be cleaned. A selection magnet carried within the handle allows engagement with at least one magnetic element in the movable portion. Positioning of the selection magnet adjacent the magnetic element actuates the movable portion for operable engagement of the second cleaning element on the inner surface of the aquarium wall.

19 Claims, 33 Drawing Sheets

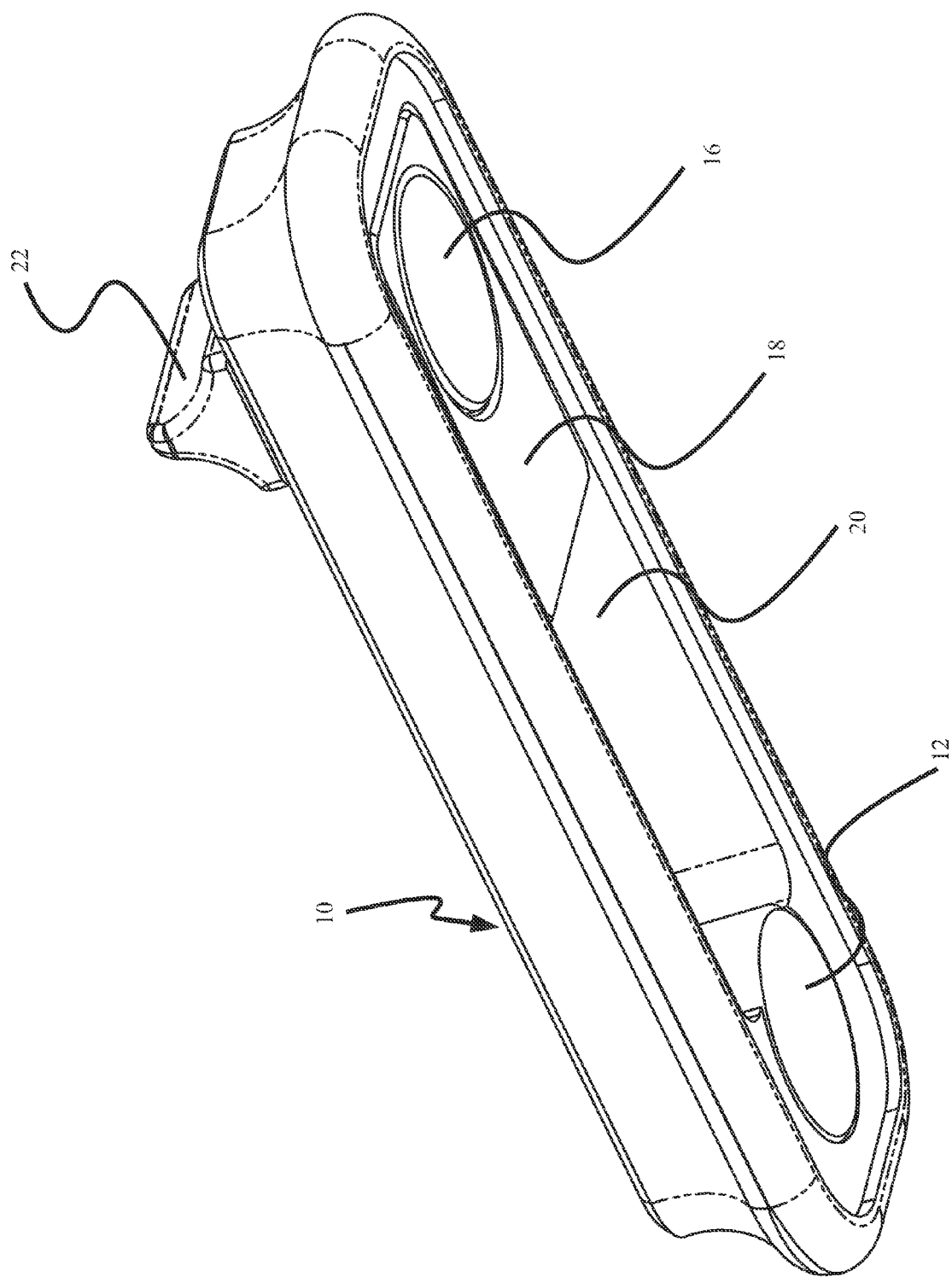

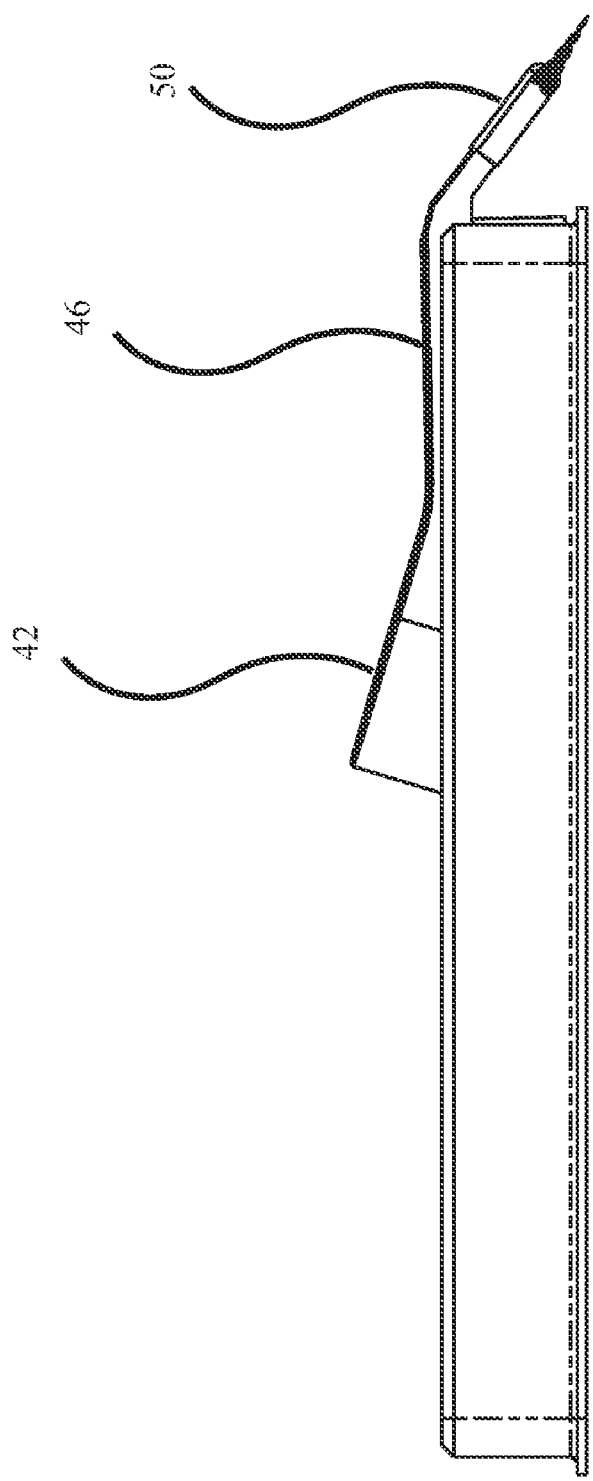

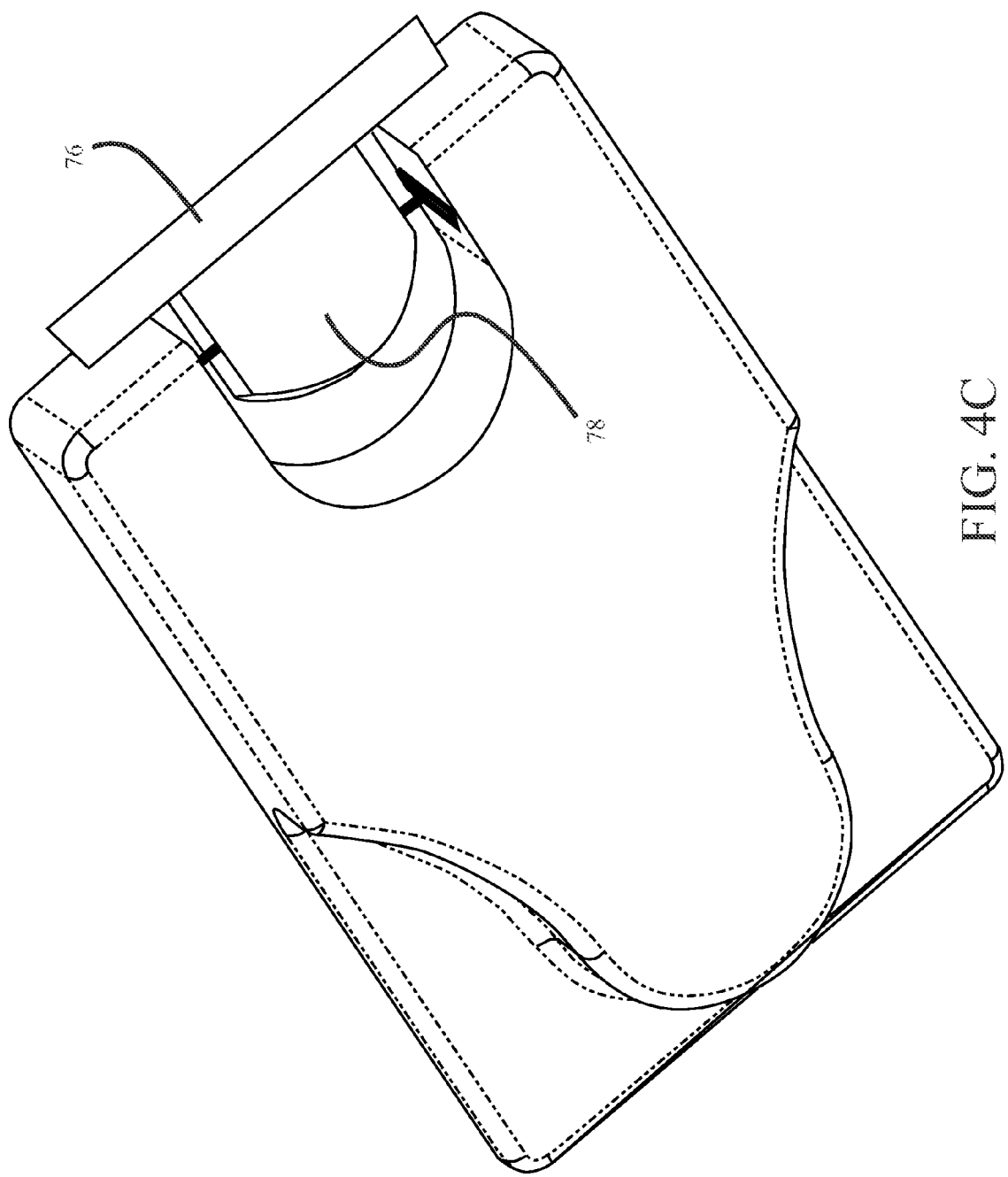

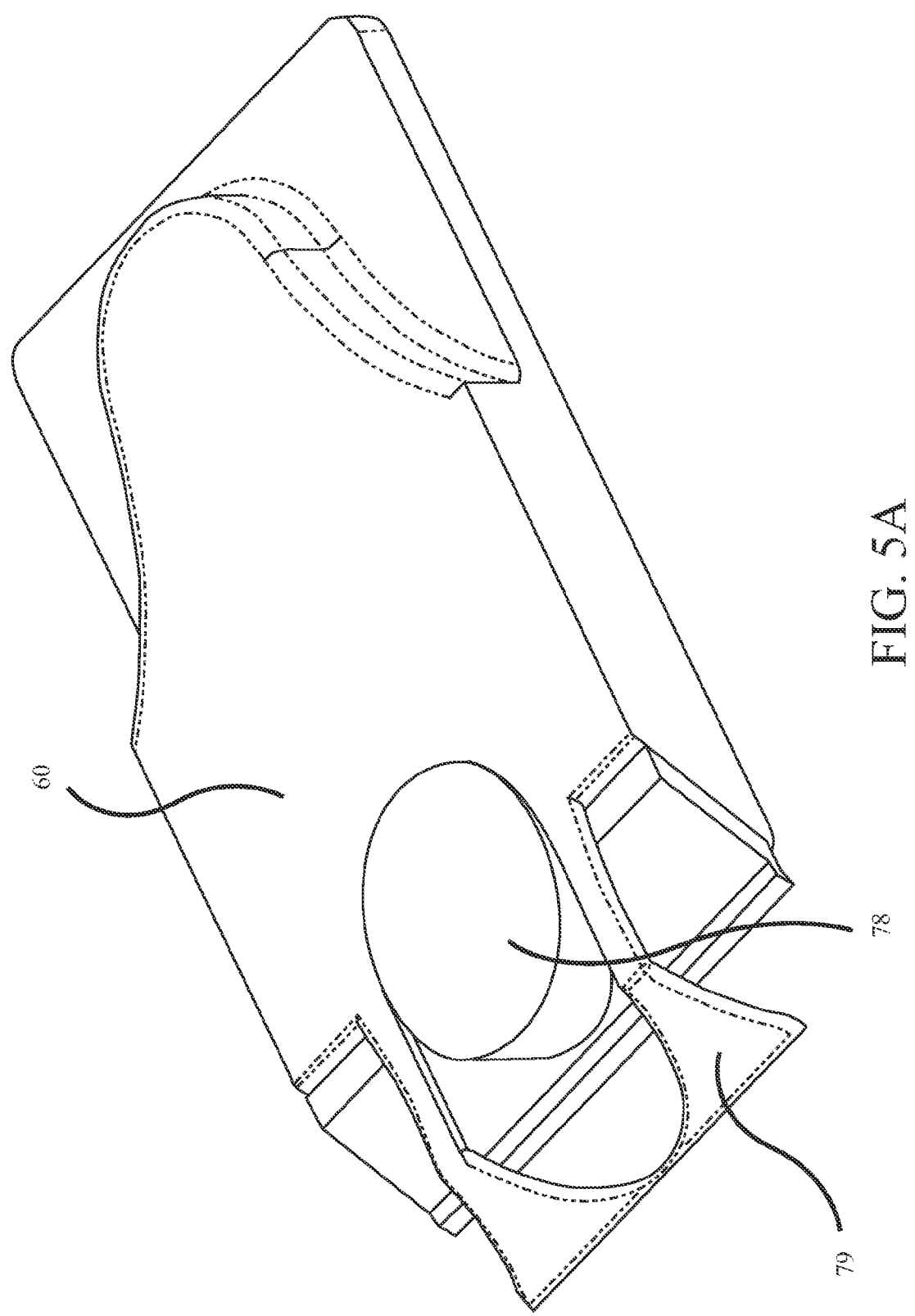

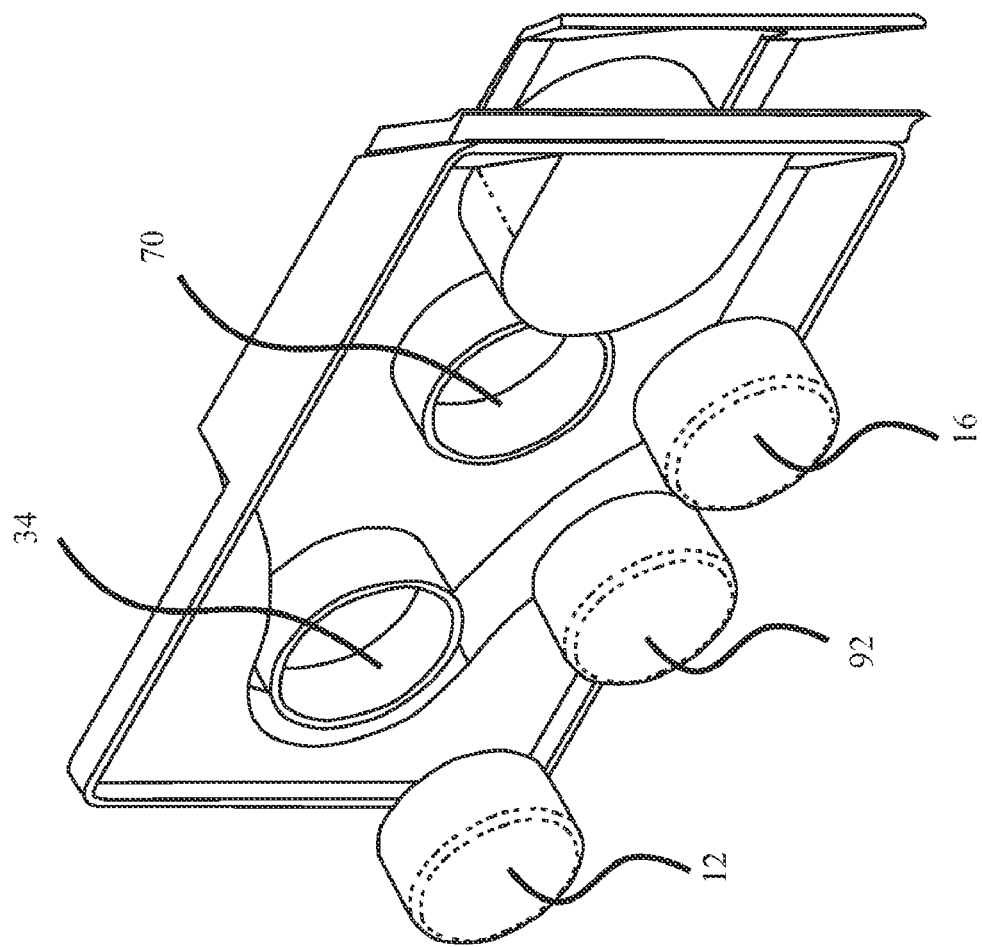

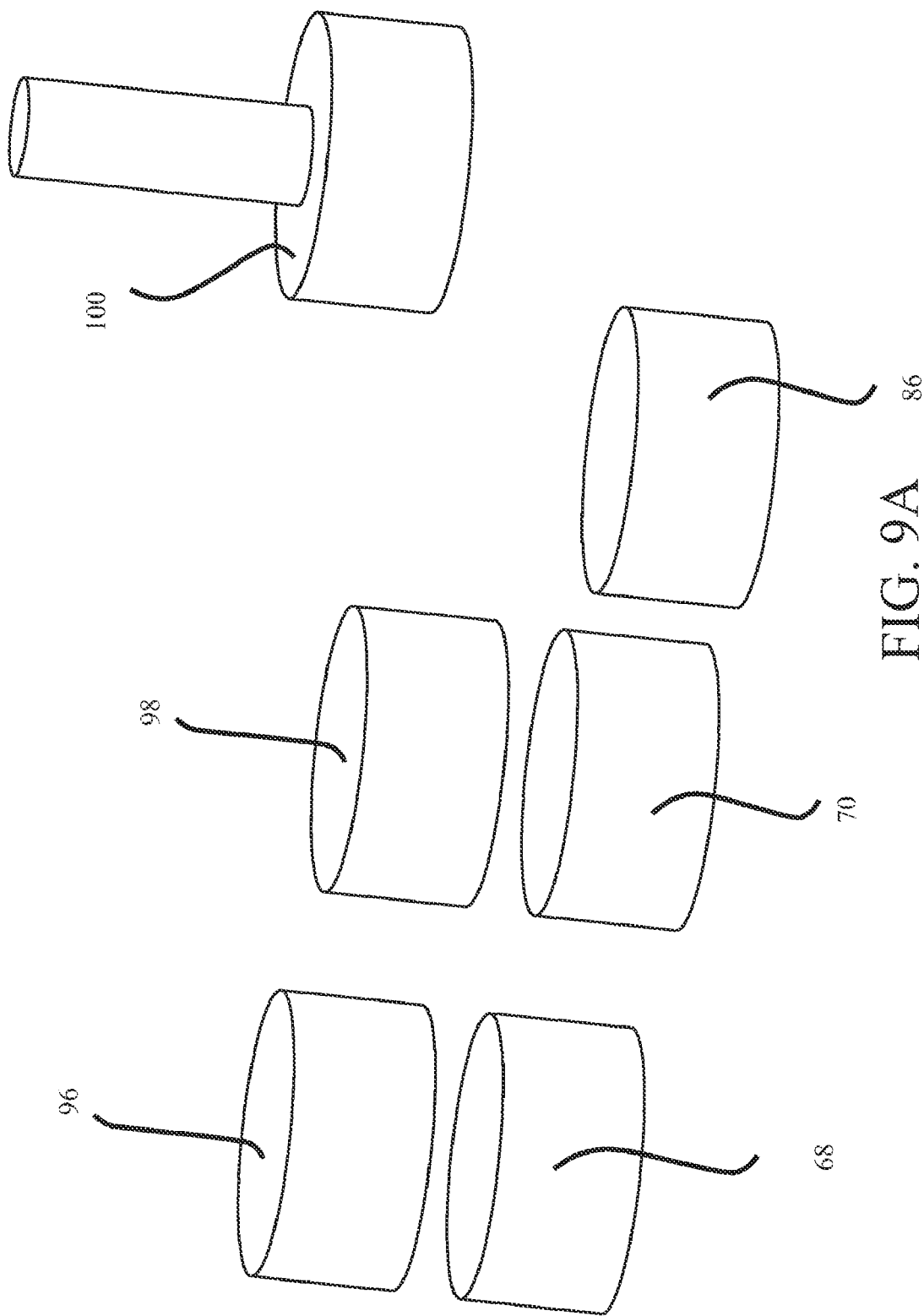

AQUARIUM CLEANING DEVICE WITH SELECTABLE SECONDARY CLEANING ELEMENT

REFERENCE TO RELATED APPLICATIONS

This application claims priority of U.S. provisional application Ser. No. 61/103,809 having a filing date of Oct. 8, 2008 entitled AQUARIUM CLEANING DEVICE WITH SELECTABLE SECONDARY CLEANING ELEMENT by inventors Duard W. Enoch, III and Harry Linden. This application with in U.S. patent application Ser. No. 11/164,161 now U.S. Pat. No. 7,506,612 filed on Nov. 12, 2005 entitled MULTIFUNCTION AQUARIUM CLEANING DEVICE by inventors Duard W. Enoch, III and Harry Linden.

BACKGROUND OF THE INVENTION

1. Field of the Invention

This invention relates generally to the field of devices for cleaning of glass surfaces and more particularly to a cleaning device having an inner component with multiple cleaning elements magnetically manipulated by an outer component and supported by a structure displaceable by the outer component to engage a secondary cleaning elements.

2. Description of the Related Art

Glass surfaces in structures such as aquariums are often difficult to clean since at least one of the surfaces may not be easily accessible. The use of cleaning elements placed on an inner surface of a aquarium wall and magnetically retained against the surface and manipulated by magnetic attraction to an outer handle component are known particularly in the aquarium cleaning art as exemplified by U.S. Pat. No. 6,348,104 entitled DEVICE AND METHOD FOR CLEANING AQUARIUM WINDOWS issued on Feb. 19, 2002 to Bakker.

Aquariums often require various types of cleaning elements to dislodge algae or other organic or inorganic buildup on the walls. The ability to employ multiple cleaning elements on a single inner component to avoid the requirement for removing and replacing an inner component with a first cleaning surface with an alternate inner component having a second type of cleaning surface simplifies the cleaning task and reduces the time necessary. An exemplary Multifunction Aquarium Cleaning Device is disclosed in U.S. patent application Ser. No. 11/164,161 having common inventors with the present application.

It is therefore desirable to provide a magnetically manipulated cleaning device for aquariums and other glass surfaces which employs selectable secondary cleaning elements to enhance the cleaning of an inner glass surface without requiring the removal of the inner component for altering the cleaning element.

SUMMARY OF THE INVENTION

The present invention provides an aquarium wall cleaning device with an inner component having a body containing magnetic support elements with a first cleaning element, typically a scrubbing pad, and a second cleaning element magnetically operable from a retracted position to an extended position for engagement with the aquarium wall. An outer component employs magnetic elements for attraction of the magnetic support elements in the inner component and operation of the second cleaning element.

A first embodiment of the present invention employs an external handle component with a fixed magnetic element for attraction of a support magnet in the inner component and a movable magnetic element for operation of the second cleaning element. The movable magnetic element reciprocates from a first position, with magnetic attraction placing the second cleaning element in the retracted position, to a second position with resultant magnetic attraction placing the second cleaning element in the extended position.

A second embodiment of the invention employs a magnet in the inner component which attracts a magnet in the second cleaning element urging the second cleaning element into the retracted position. The external handle component employs a magnetic element to overcome the attraction of the magnet in the inner component to draw the second cleaning element into the extended position for operation.

BRIEF DESCRIPTION OF THE DRAWINGS

These and other features and advantages of the present invention will be better understood by reference to the following detailed description when considered in connection with the accompanying drawings wherein:

FIG. 1C is a bottom isometric view of the outer component of FIG. 1A with the selector element in a second position;

FIG. 2G is a side view of the inner complement with the second cleaning element in the lowered position;

FIG. 4C is a top isometric view of the inner component of FIG. 4B;

FIG. 5A is a top isometric view of a second version of the support for the second cleaning element in a retracted position;

FIG. 5E is an isometric bottom view with a representation of external magnet positioning for retraction of the second cleaning element;

FIG. 9A is an isometric view of the magnetic elements of a third outer component embodiment with the second cleaning element in the retracted position;

DETAILED DESCRIPTION OF THE INVENTION

Figure 1A:
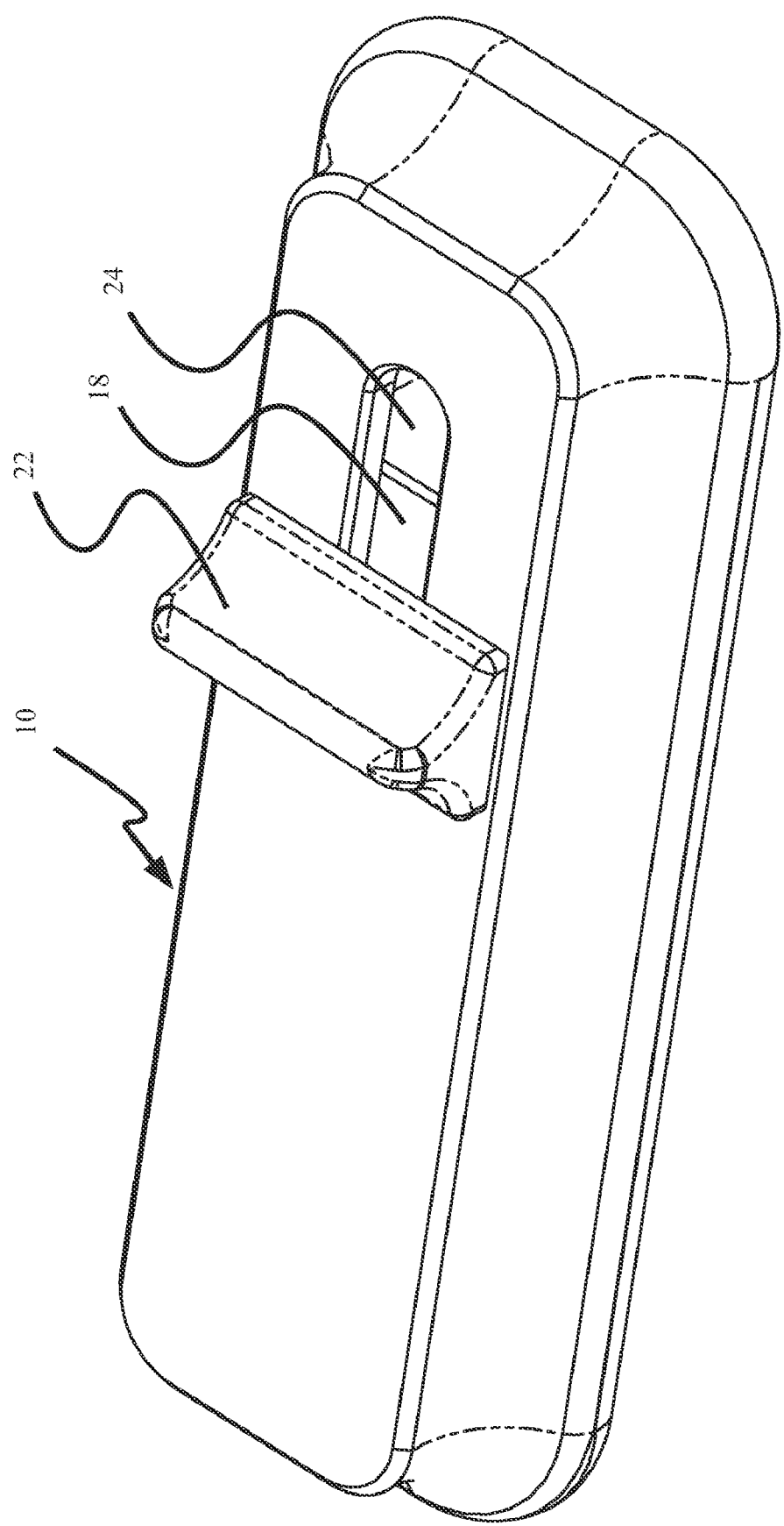
FIG. 1A is a top isometric view of a first embodiment of the outer component or handle.
Figure 1B:
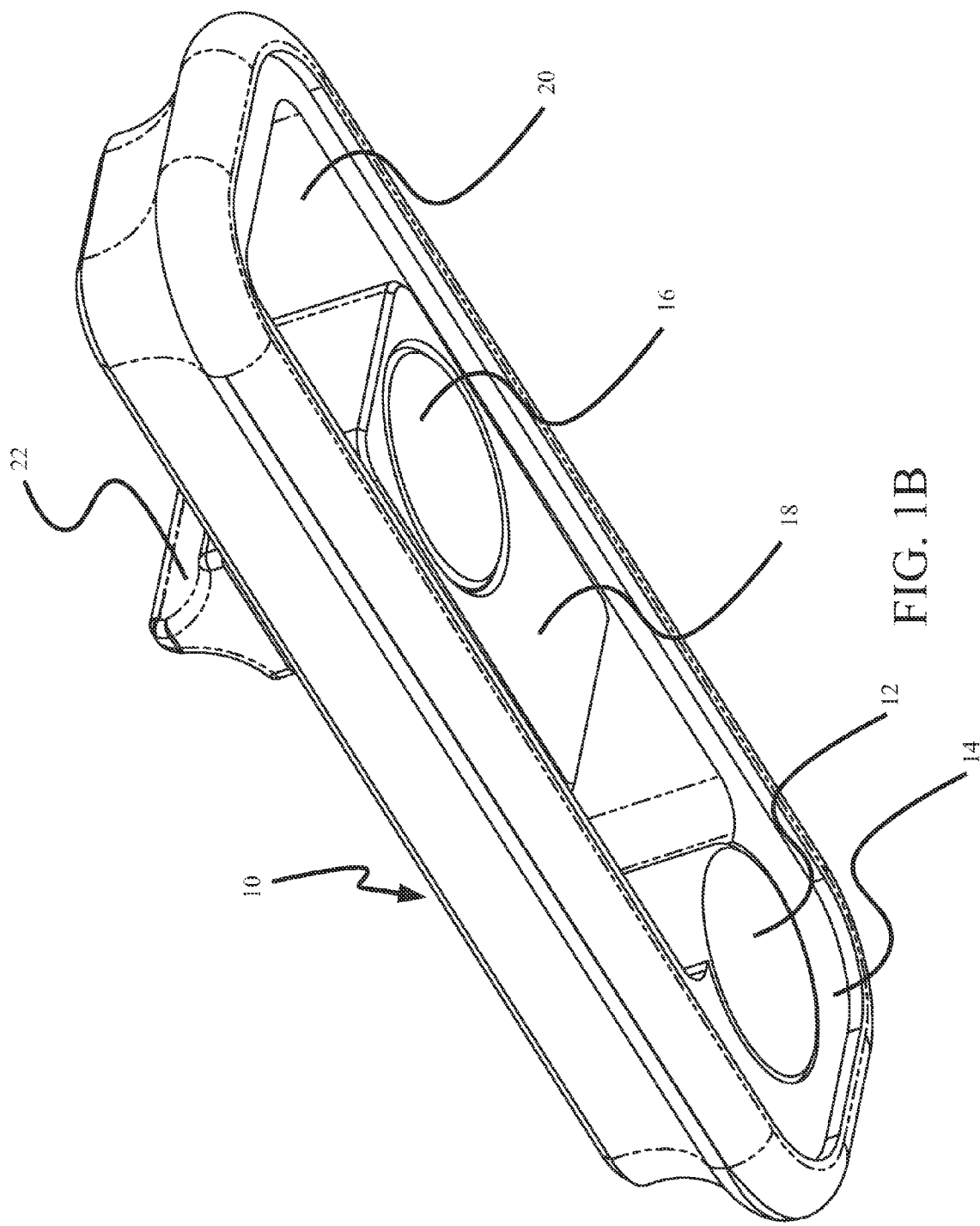
FIG. 1B is a bottom isometric view of the outer component of FIG. 1A with the selector element in a first position.

The present invention provides an aquarium cleaning device employing an external handle and an internal cleaning element, magnetically controlled and manipulated by the handle to allow at least two separate cleaning functions. In a first embodiment, the handle includes control elements for selecting supplemental or secondary cleaning devices on the internal cleaning element. As shown in FIGS. 1A, 1B and 1C, a handle 10 which is employed on the exterior of the aquarium wall has a first magnetic element 12 embedded in a relief 14 in the handle and a second operating or selection magnetic element 16 which is carried in a shuttle element 18 received for reciprocal motion in a slot 20 in the handle. An actuating slider switch 22 is connected to the shuttle element through a top slot 24 for positioning in a first retracted position as shown in FIG. 1B or a second extended position as shown in FIG. 1C.

Figure 2A:
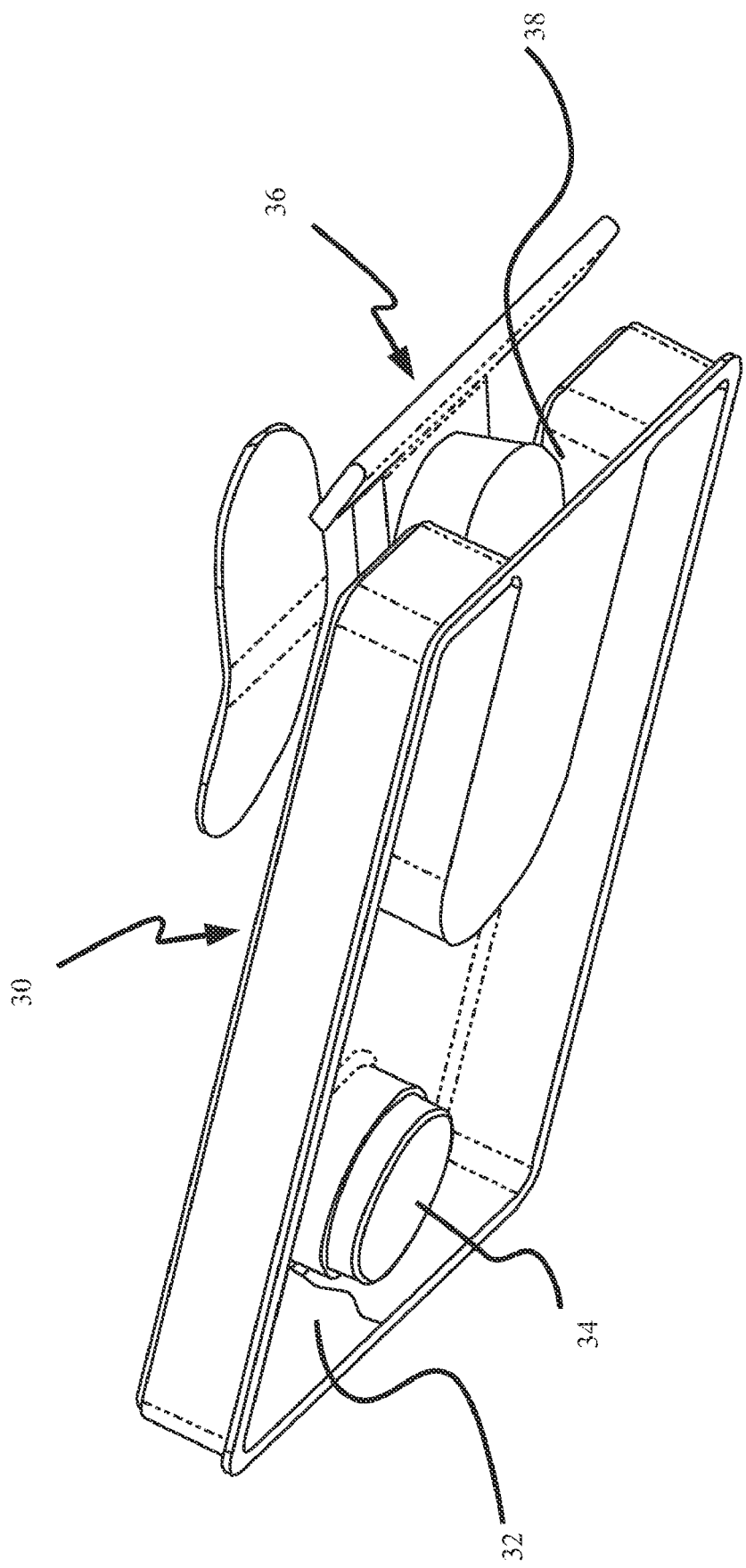
FIG. 2A is an isometric bottom view of an inner component.
Figure 2B:
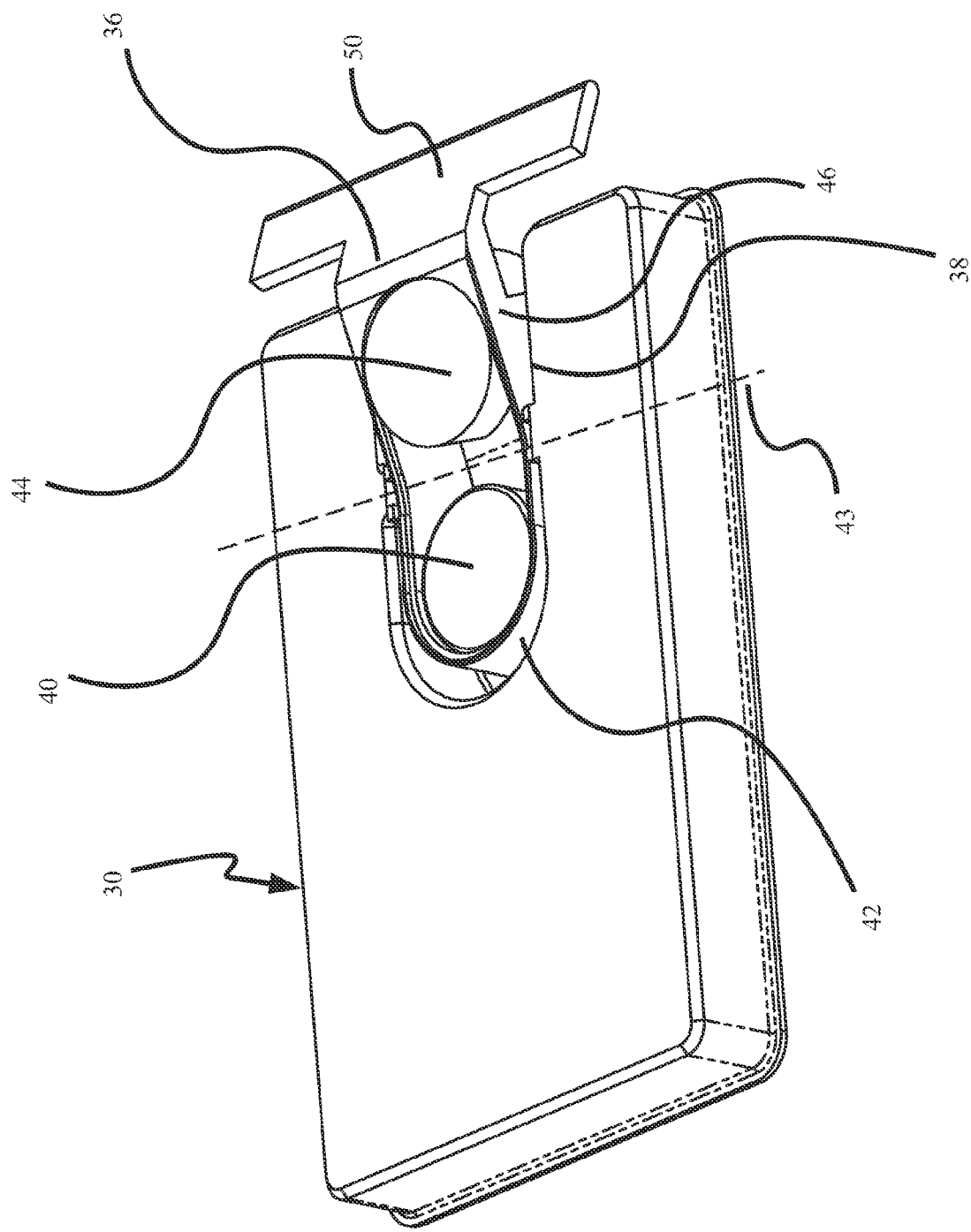
FIG. 2B is a top isometric view of the inner component shown in FIG. 2A.

An inner cleaning element 30 which is placed inside the aquarium tank is shown in FIG. 2A. The inner element has a bottom cleaning surface 32 shown a partially section and is held in place on the aquarium wall with a support magnet 34 attracted to first magnetic element 12 in the handle. Movement of the handle on the outside of the aquarium wall then causes corresponding movement of the inner cleaning element scrubbing the interior of the aquarium wall with the cleaning surface. The inner element also carries a movable element 36 for magnetic actuation as will be described in greater detail subsequently. In one embodiment the movable element is carried in a slot 38 and has a first magnet 40 associated with a first portion 42 of the movable element on a first side of a pivot axis 43 and a second magnet 44 associated with a second portion 46 of the movable element on the opposite side of the pivot axis. While the inner component is shown in the embodiments herein as having substantial depth perpendicular to the bottom cleaning surface, the movable element may be supported above a substantially flat cleaning element in alternative embodiments. With the inner cleaning element and handle magnetically joined across the aquarium wall with the support magnet and first magnetic element, the selection magnet in the handle when placed in a first position using the slider switch (as shown in FIG. 1B) attracts first magnet 40 maintaining the first angular portion in contact with the bottom of slot 38 retracting or raising the blade as shown in FIGS. 2E and 2F. When the slider switch is moved to the other extent of slot 20 moving selection magnet 16 to the opposite extent of the slot, attraction with first magnet 40 is broken and second magnet 44 is attracted causing the movable element to actuate by rocking about the pivot to place the second angular portion in contact with the bottom of slot 38 and bringing a scrapper 50 into contact with the inner surface of the aquarium wall in and extended or lowered position as shown in FIGS. 2G and 2H.

Figure 2C:
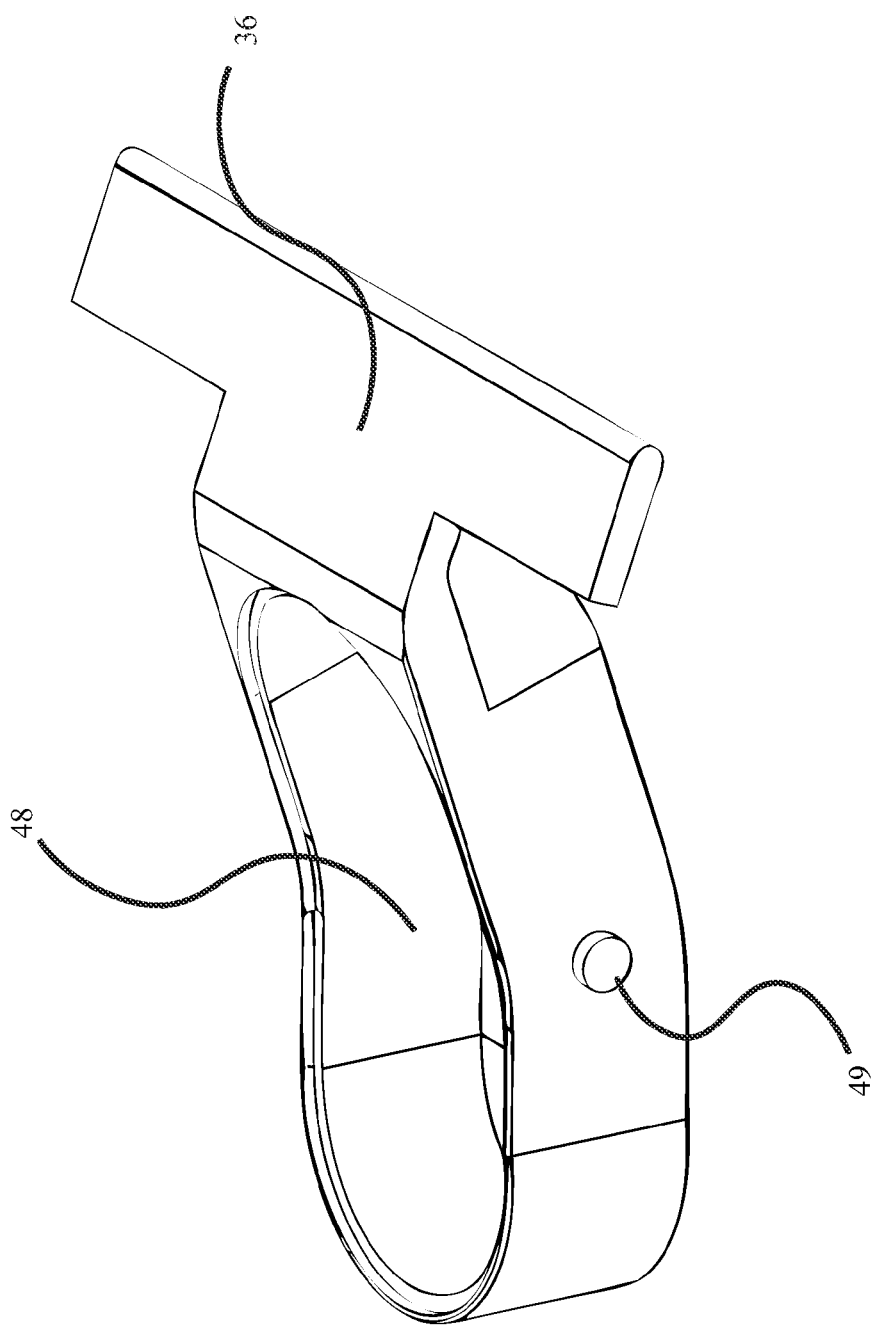
FIG. 2C is an isometric top view of the rotating component of the inner element of FIG. 2A.
Figure 2D:
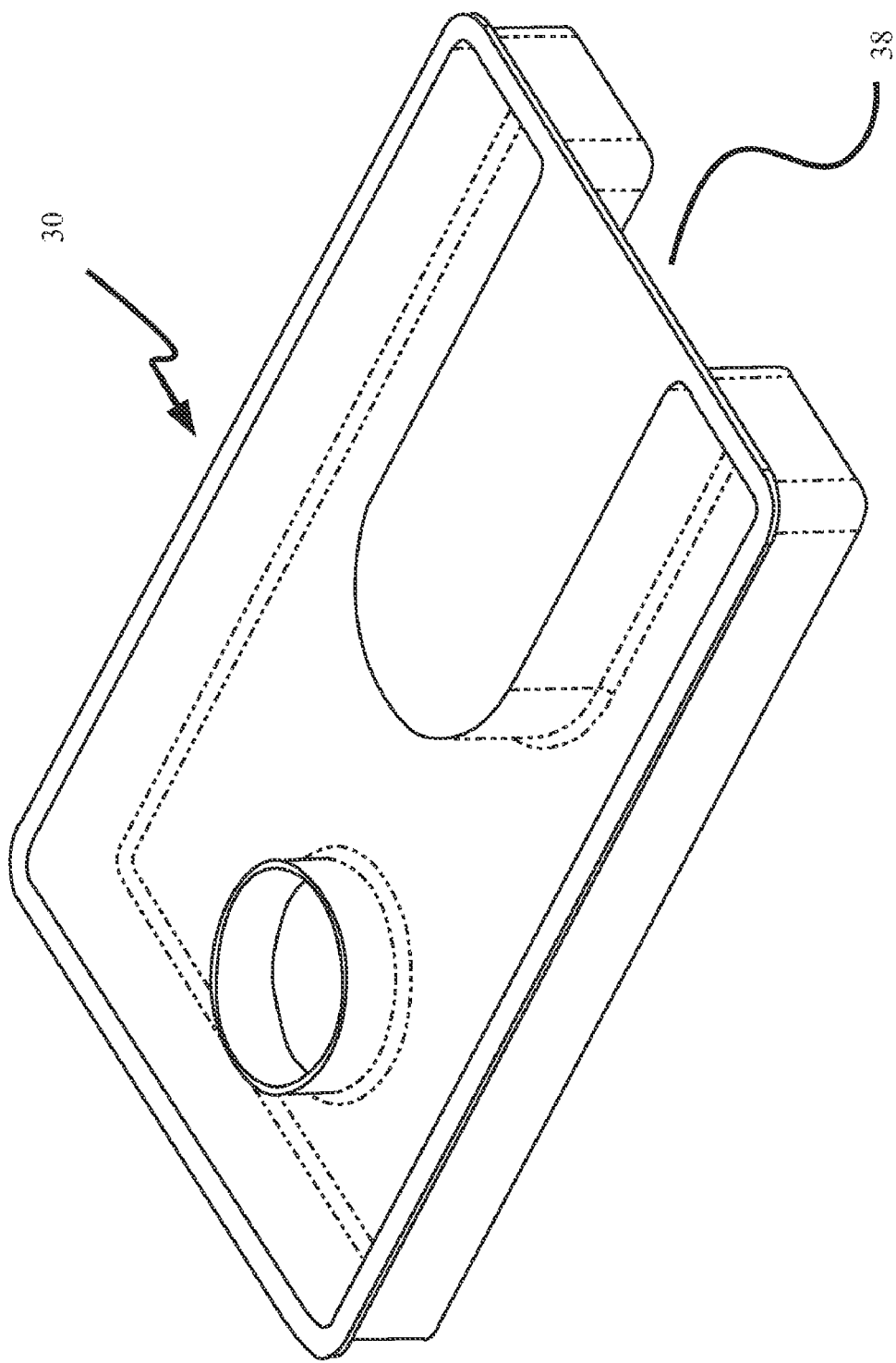
FIG. 2D is an isometric bottom view of the case of the inner component of FIG. 2A.
Figure 2E:
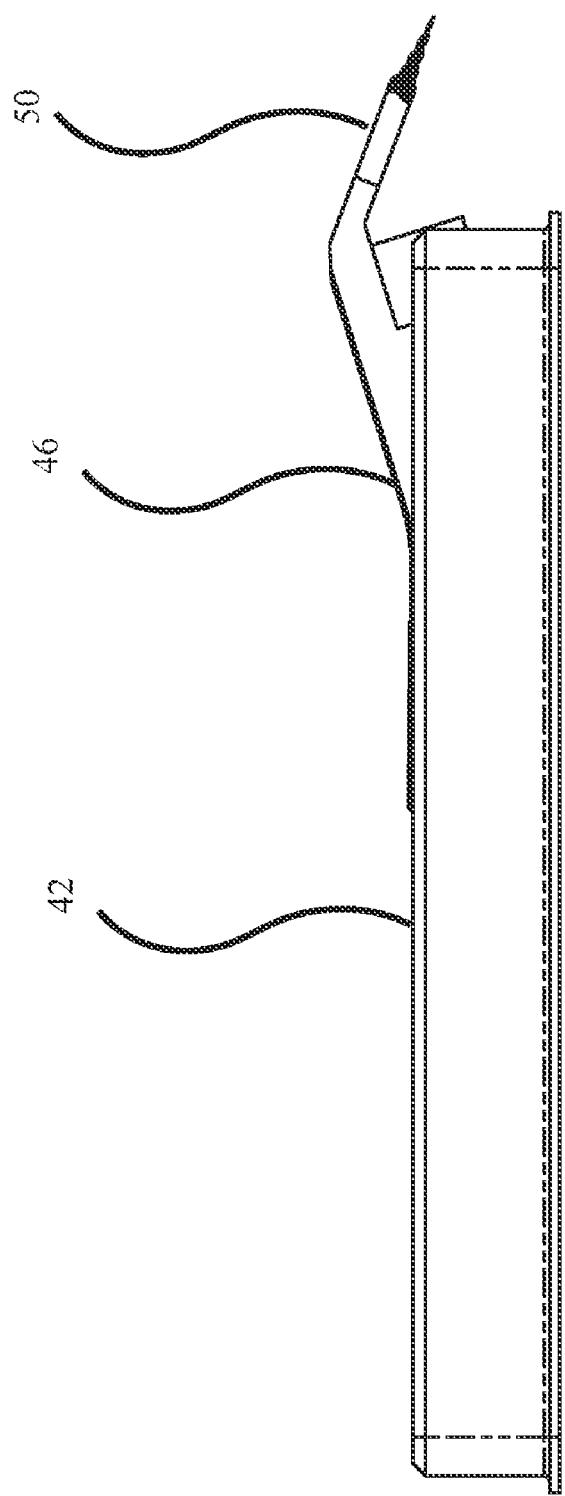
FIG. 2E. is a side view of the inner component with the second cleaning element in the raised position.
Figure 2F:
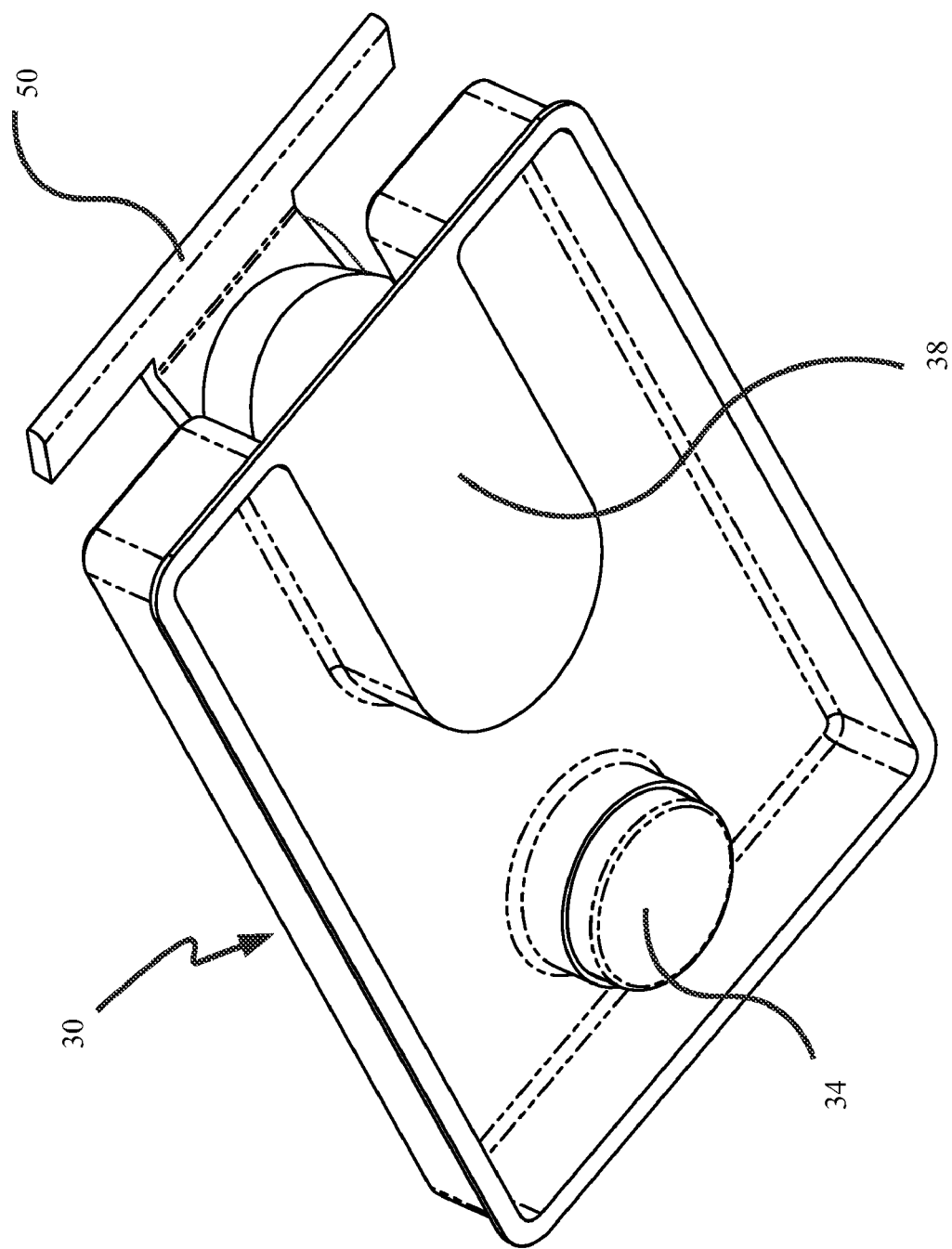
FIG. 2F. is a bottom isometric view of the inner component with the second cleaning element in the raised position.
Figure 2H:
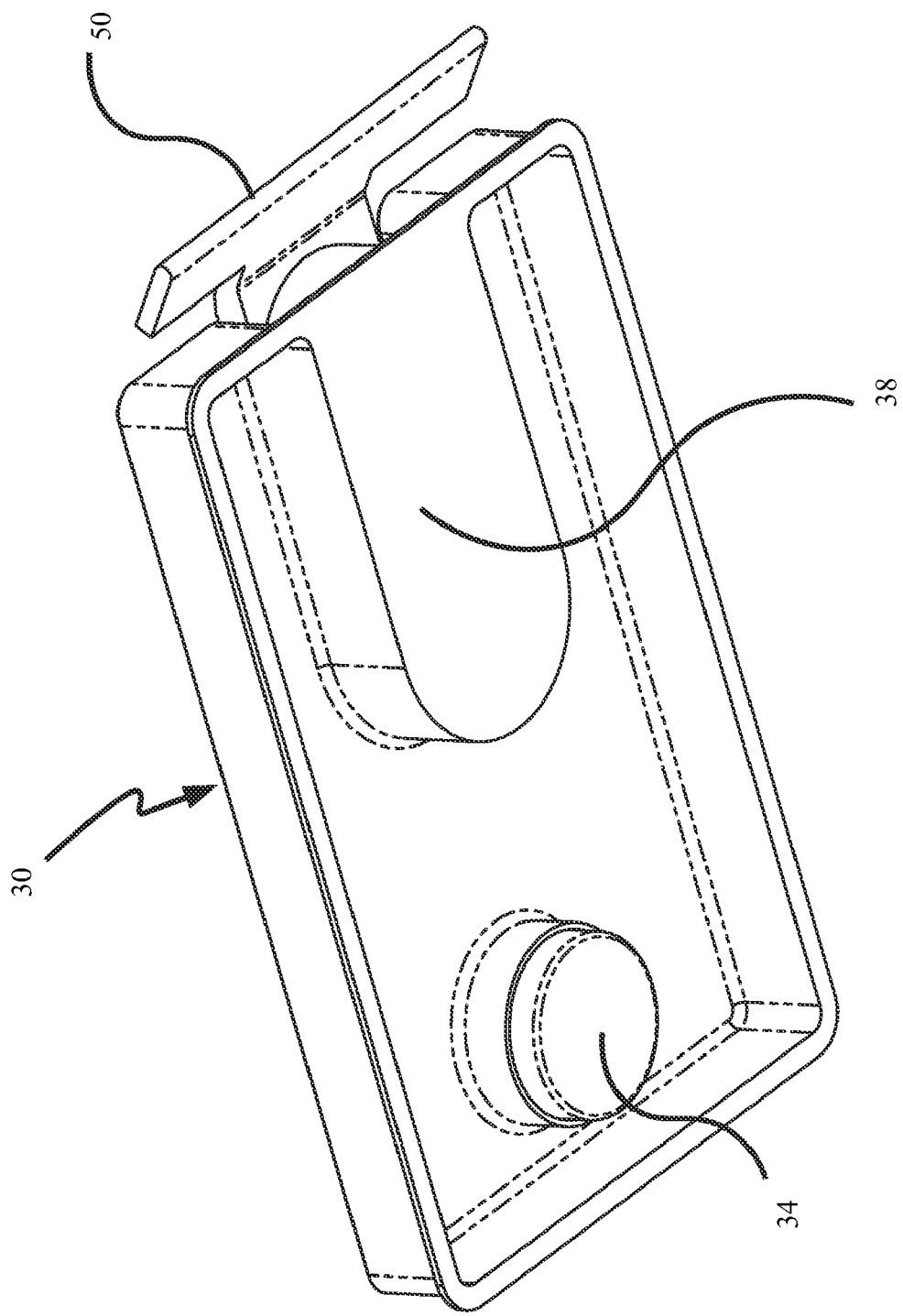
FIG. 2H. is a bottom isometric view of the inner component with the second cleaning element in the lowered position.

In an alternative embodiment the movable element as shown in FIG. 2C incorporates a smooth channel 48 which extends to opposite sides of pivot points 49 and carries a single magnet which is loosely received for motion within the channel. With the slider switch on the external handle placed in the first position the single magnet is attracted and slides to the rearward extent of the channel causing the movable element to rock about the pivot points to maintain the first angular portion in contact with the slot placing the blade in the retracted position. Moving the slider switch to the second position attracts the single magnet causing it to slide to the forward extent of the channel and causing the movable element to rock forward about the pivot points placing the blade in the extended position for contact with the aquarium wall.

The magnetic attraction between the selection magnet in the handle and the magnet or magnets in the inner cleaning component provides supplemental attraction for the handle and inner cleaning component to firmly position the inner cleaning component on the inner surface of the aquarium wall. The moment arm provided between the first magnetic element and selection magnet in the handle and the support magnet and first or second magnet in the inner cleaning component provide control for the inner component to align with the handle and therefore match both linear and rotational motion of the handle for scrubbing the inner wall or positioning the scraper in the desired orientation.

Figure 3A:
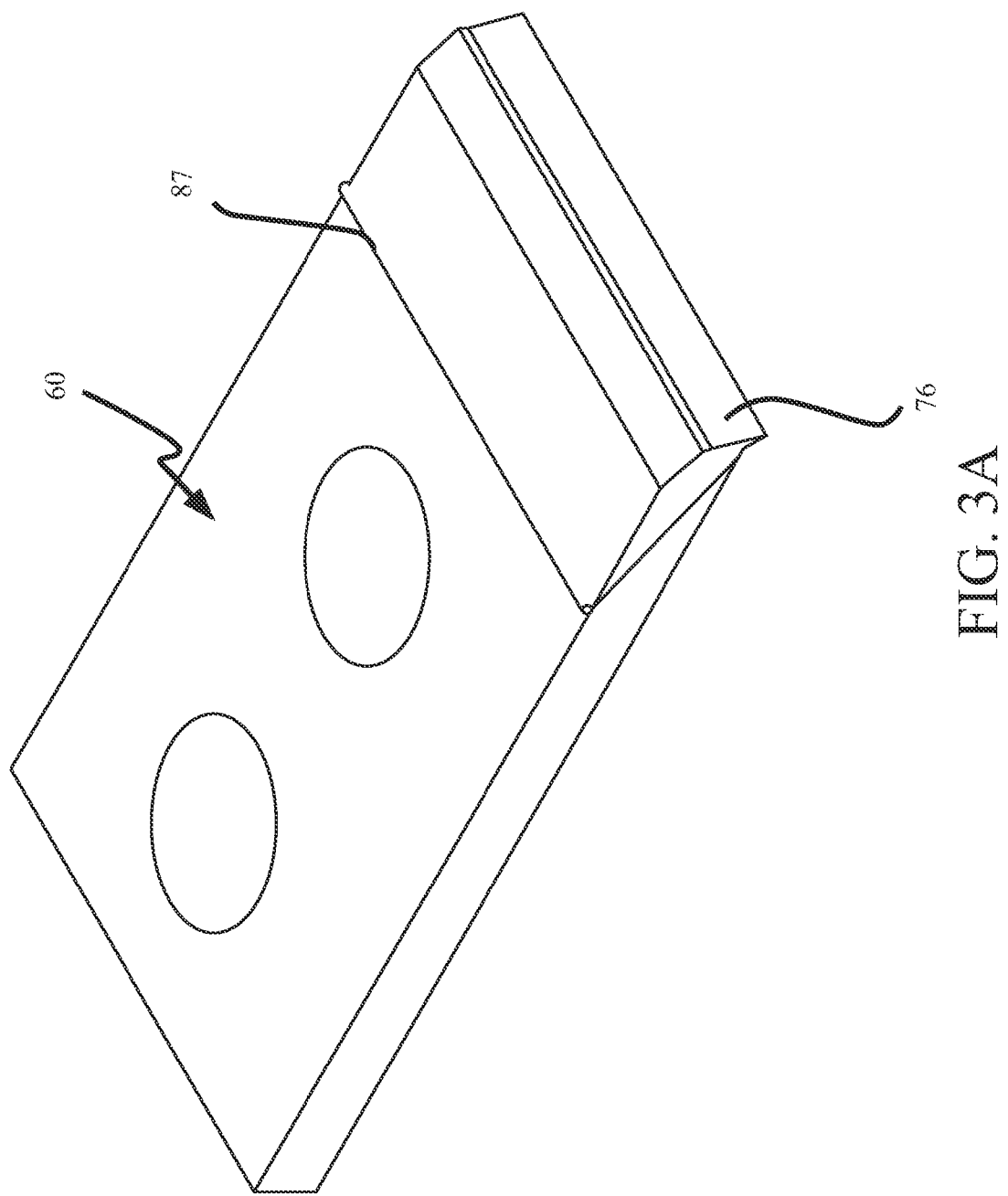
FIG. 3A is a top isometric view of a living hinge support system for the second cleaning element with the cleaning element lowered and engaged with the aquarium wall.
Figure 3B:
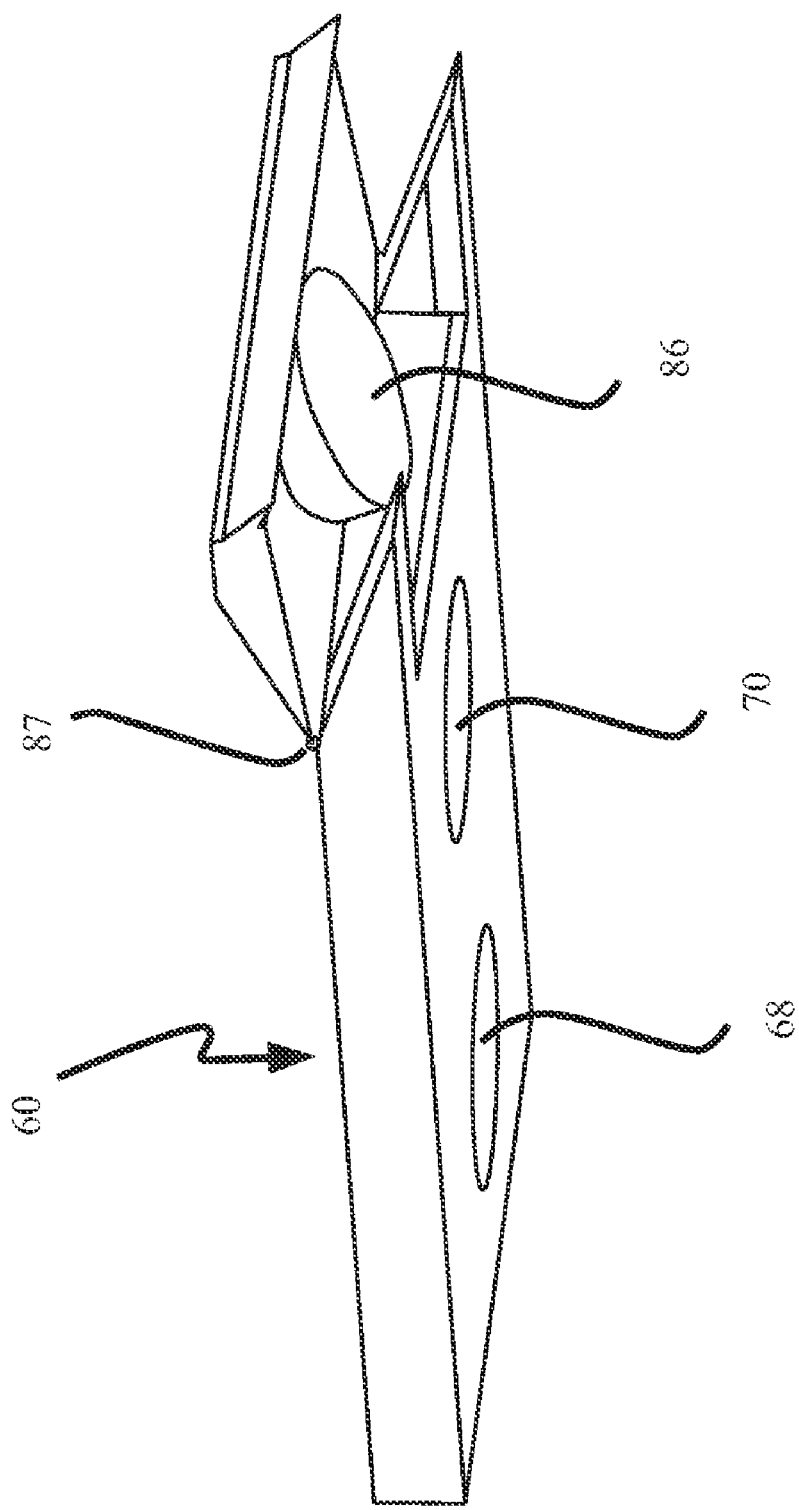
FIG. 3B is a bottom isometric view of a living hinge support system for the second cleaning element with the cleaning element retracted from the aquarium wall.

In an alternative configuration of the embodiment, the second cleaning element is supported from the body of the internal component by a living hinge 87 as shown in FIGS. 3A and 3B. Operation of the handle for placement of the first operating or selection magnet adjacent the extension magnet 86 draws the shuttle for the second cleaning element downward onto the aquarium surface. Operation of the selection magnet away from the extension magnet allows the living hinge to relax drawing the shuttle away from the aquarium surface. The living hinge may derive its translation force from integral material shaping or from a supplement spring element operating either rotationally or linearly as shown in phantom. In an exemplary embodiment, a magnet is permanently attached to a plastic hinge/scraper that is naturally up, off the glass. When the selection magnet is rotated into proximity with the magnet bends the hinge and brings the scraper to the glass. The plastic hinge is a flat piece of plastic that has a "V" notch placed approximate center. The natural tendency for the plastic is to lift up to close the "V".

Figure 4A:
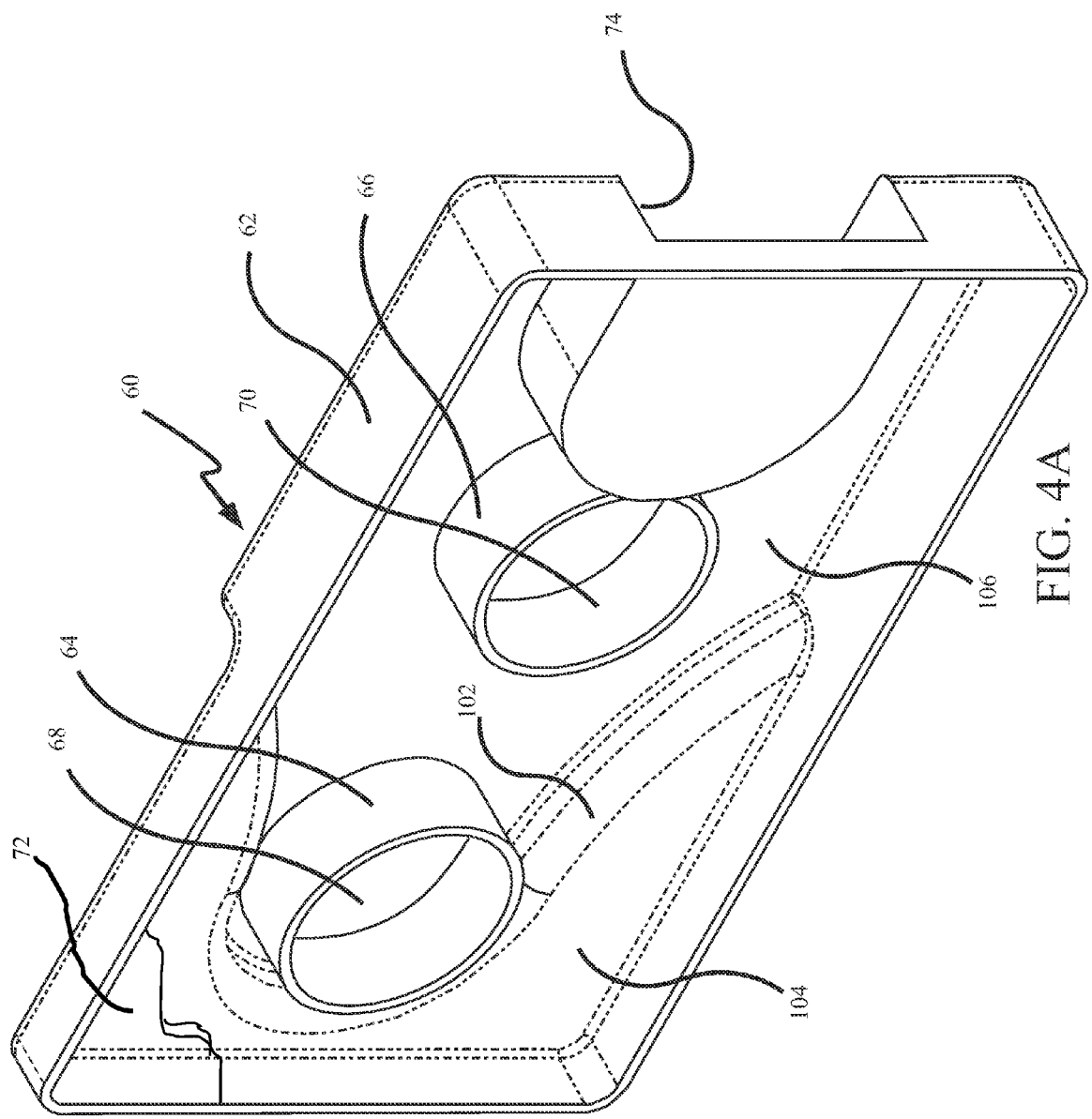
FIG. 4A is a bottom isometric section view of the case of a second embodiment of the inner component.

A second embodiment of the invention is shown in FIG. 4A. The inner component 60 incorporates a case 62 which includes retention cavities 64 and 66 for a first support magnet 68 and a second support magnet 70 respectively. Operation of the shuttle is accomplished by altering magnetic attraction between the second support magnet and the extension magnet using magnetic elements in the external component.

As with the prior embodiment the bottom surface of the case supports a first cleaning element such as an abrasive pad 72 (shown in partial section). A slot or relief 74 in the upper surface of the case provides a housing for an extendible second cleaning element.

Figure 4B:
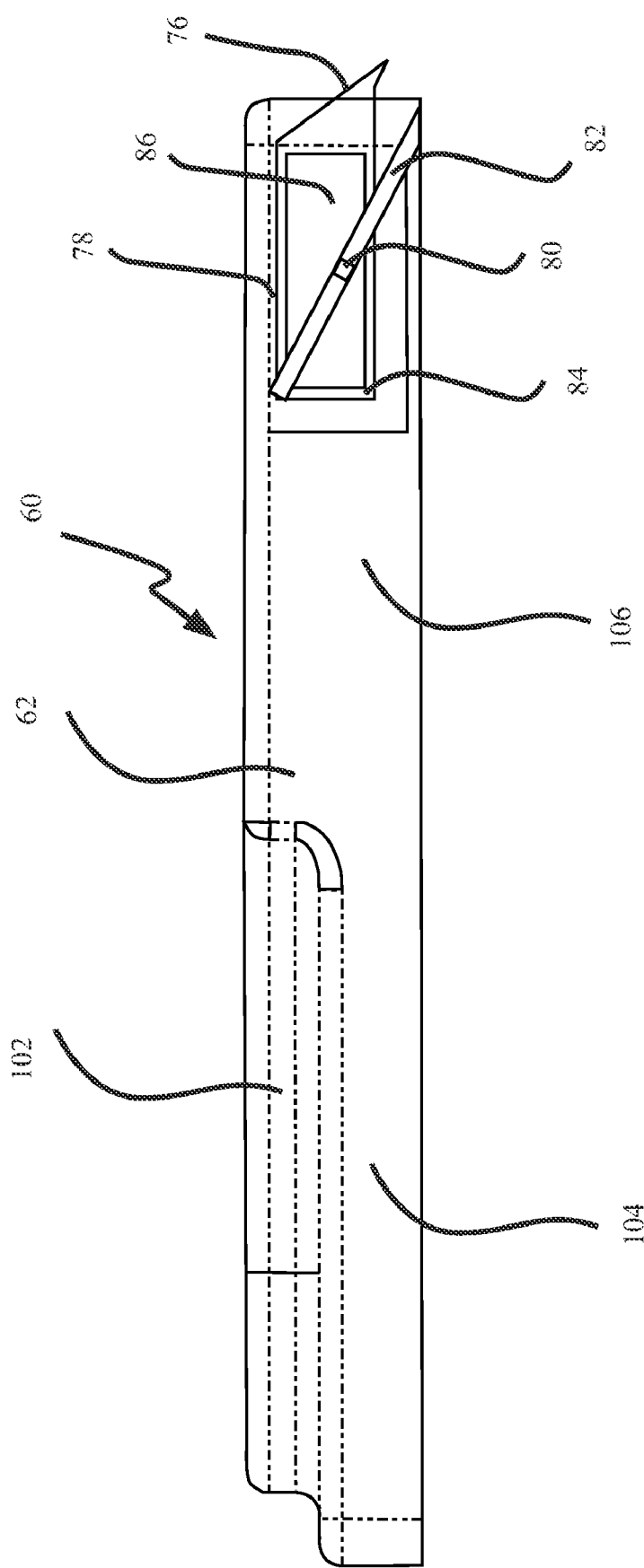
FIG. 4B is a side view of the second embodiment of the inner component with the second cleaning element in the retracted position.
Figure 5B:
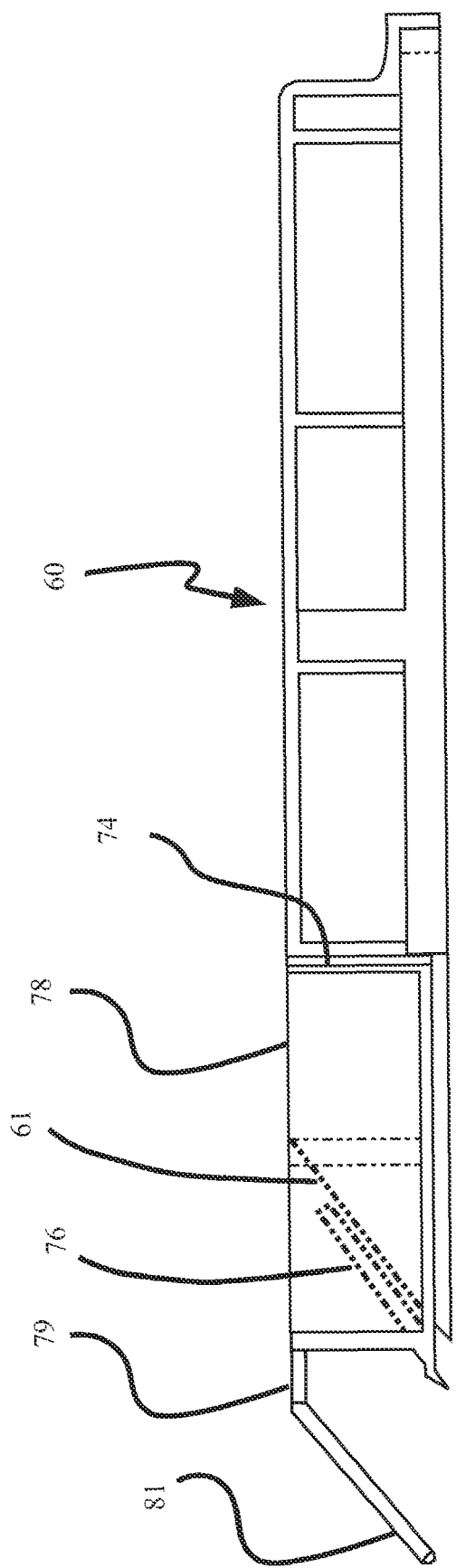
FIG. 5B is a side view of the second embodiment of the inner component with the second version of the support for second cleaning element in the retracted position.

The views in FIGS. 4B and 4C show a first version of the second extendible cleaning element in detail. For the embodiment shown in the drawings a blade 76 expands from a shuttle 78. The shuttle incorporates pins 80 extending from its sides to be movable when received in slots 82 on opposite walls of the relief 74. The shuttle incorporates a chamber 84 to constrain an extension magnet 86. In the view shown in FIG. 4B the second cleaning element is in a retracted or raised position. FIGS. 5A and 5B show the inner element of the second embodiment with the second cleaning element in the retracted or raised position.

For the embodiment shown in the drawings the pins 80 incorporate a rectangular cross-section received within slots 82 to maintain orientation of the shuttle in a substantially horizontal position in the retracted and extended position. In alternative embodiments multiple pins on each side of the shuttle or an alternative track securing method are employed to maintain relative orientation of the shuttle. The shuttle moves from the retracted to the extended position by transitioning down the slots to place the blade in contact with the aquarium inner surface being cleaned. With a shuttle in the retracted position the blade is held clear from the surface allowing vigorous circular or orbital motion of the cleaning pad on the inner component without fear of marring or scratching the surface with the blade.

Figure 5C:
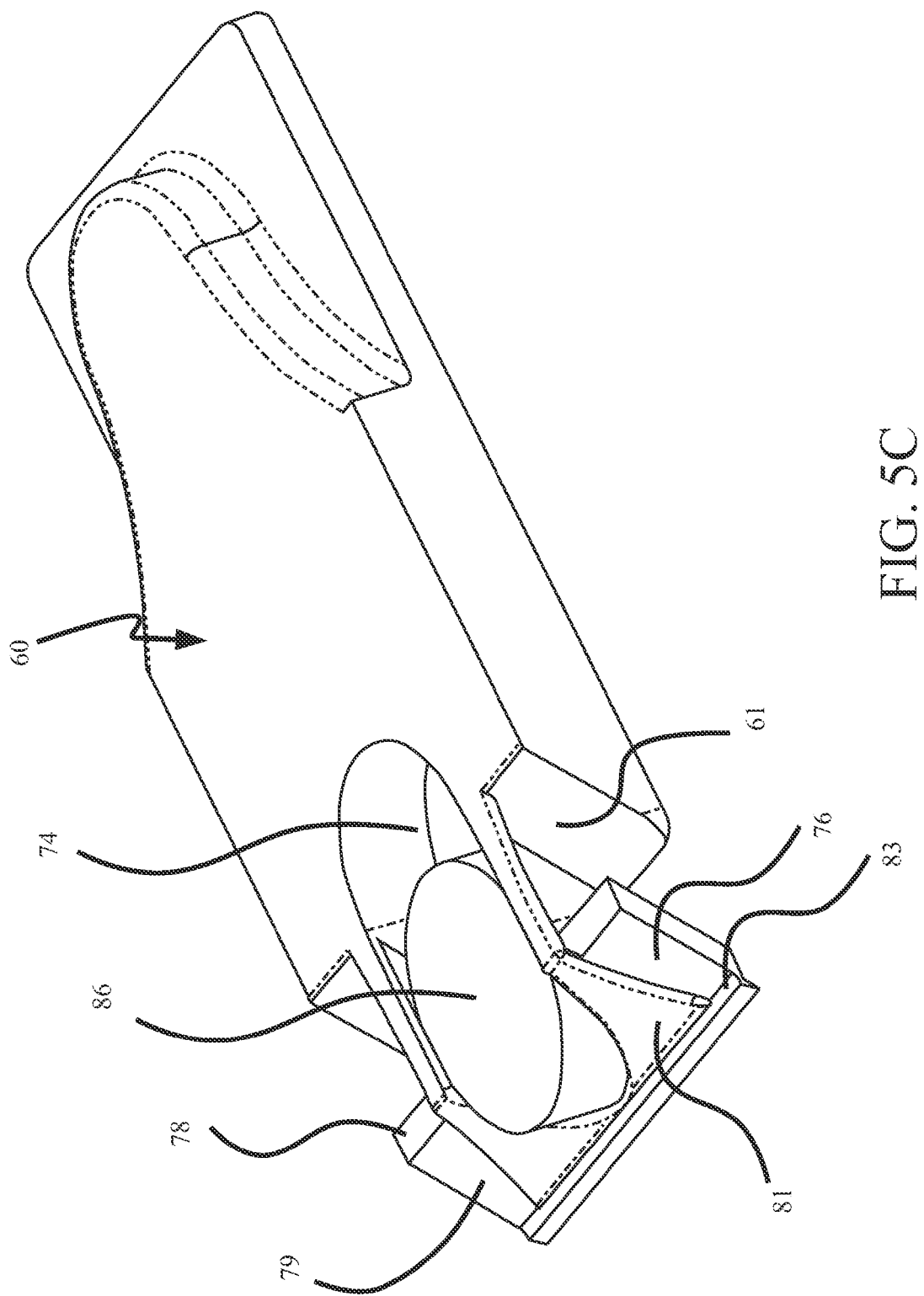
FIG. 5C is a top isometric view of the inner component of FIG. 5A.
Figure 5D:
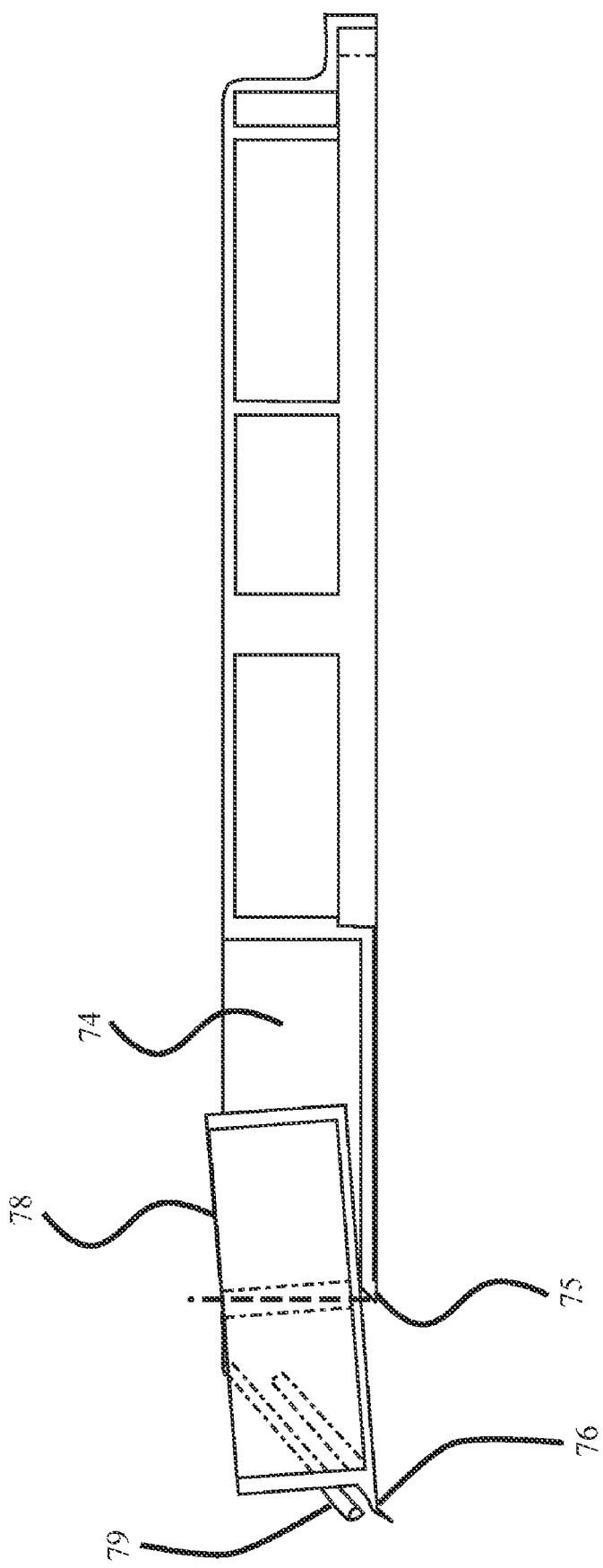
FIG. 5D is a side view of the second embodiment of the inner component with the second version of the cleaning element in the extended position.

The views in FIGS. 5A-5F demonstrate an alternative version of the second extendible cleaning element. A shuttle 78 containing magnet 86 is loosely constrained in relief 74. As with the previously described version, blade 76 is carried by the shuttle extending from the front and sides of the shuttle wall. A holder 79 extends from the body of the inner component to surround and constrain the shuttle and blade within the relief. As shown in FIGS. 5A and 5B with the shuttle in the retracted position the blade rests against inclined faces 61 on the body of the inner component with the shuttle urged against the rearward extent of the relief. FIGS. 5C and 5D show the shuttle in the extended position wherein the blade and shuttle are constrained by the holder to prevent extraction from the relief.

Figure 5F:
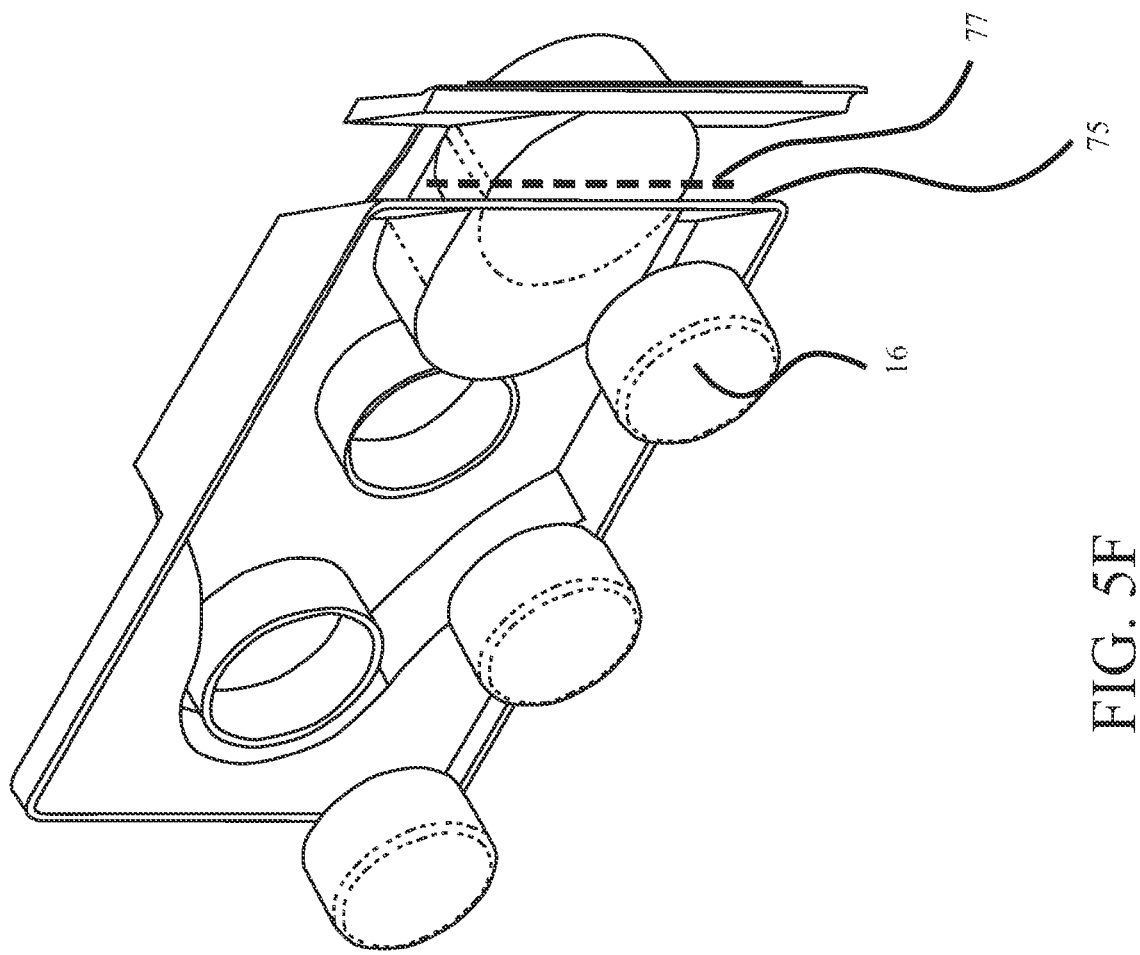
FIG. 5F is an isometric bottom view with a representation of external magnet positioning for extension of the second cleaning element.

As shown in FIGS. 5A, 5B and 5E, in the retracted position the shuttle is constrained by the bottom wall of the relief and the blade is constrained by the inclined faces on the body to remove the blade from contact with the aquarium wall. When extended, as shown in FIGS. 5C, 5D and 5F, the shuttle is drawn outward in the relief. Holder 79 is dimensioned to allow a tipping axis 77 of the shuttle to extend beyond the forward edge 75 of the relief. Magnetic attraction between the external component and magnet 86 in the shuttle causes of the shuttle to rotate about the forward edge of the bottom of the relief to place the blade in contact with the aquarium wall. The thickness of the body wall remaining under the relief determines the amount of rotation available for the shuttle. An angled plate 81 on the holder additionally provides contact for the blade in the rotated position. A shelf 83 on the blade contacts the bottom edge of the plate to provide additional resistance for the blade to urge contact with the aquarium wall.

FIGS. 5E and 5F demonstrate magnet positions for a three magnet outer component having a sliding magnetic element 16 as previously described with respect to FIGS. 1A through 1C used in conjunction with the inner component embodiment described in FIGS. 2A through 6D. A first magnetic element 12 for attraction of a first support magnet 34 and a supplemental magnetic element 92 for attraction of a supplemental support magnet 70 position the internal component on the aquarium wall for operation. Operating magnet 16 is positionable from a first position shown in FIG. 5E to retract the shuttle into the relief to a second position as shown in FIG. 5F to extend and rotate the shuttle for engagement of the blade. An alternative external handle configuration employing only two magnets is discussed subsequently with respect to FIGS. 7 and 8A, 8B.

Figure 6A:
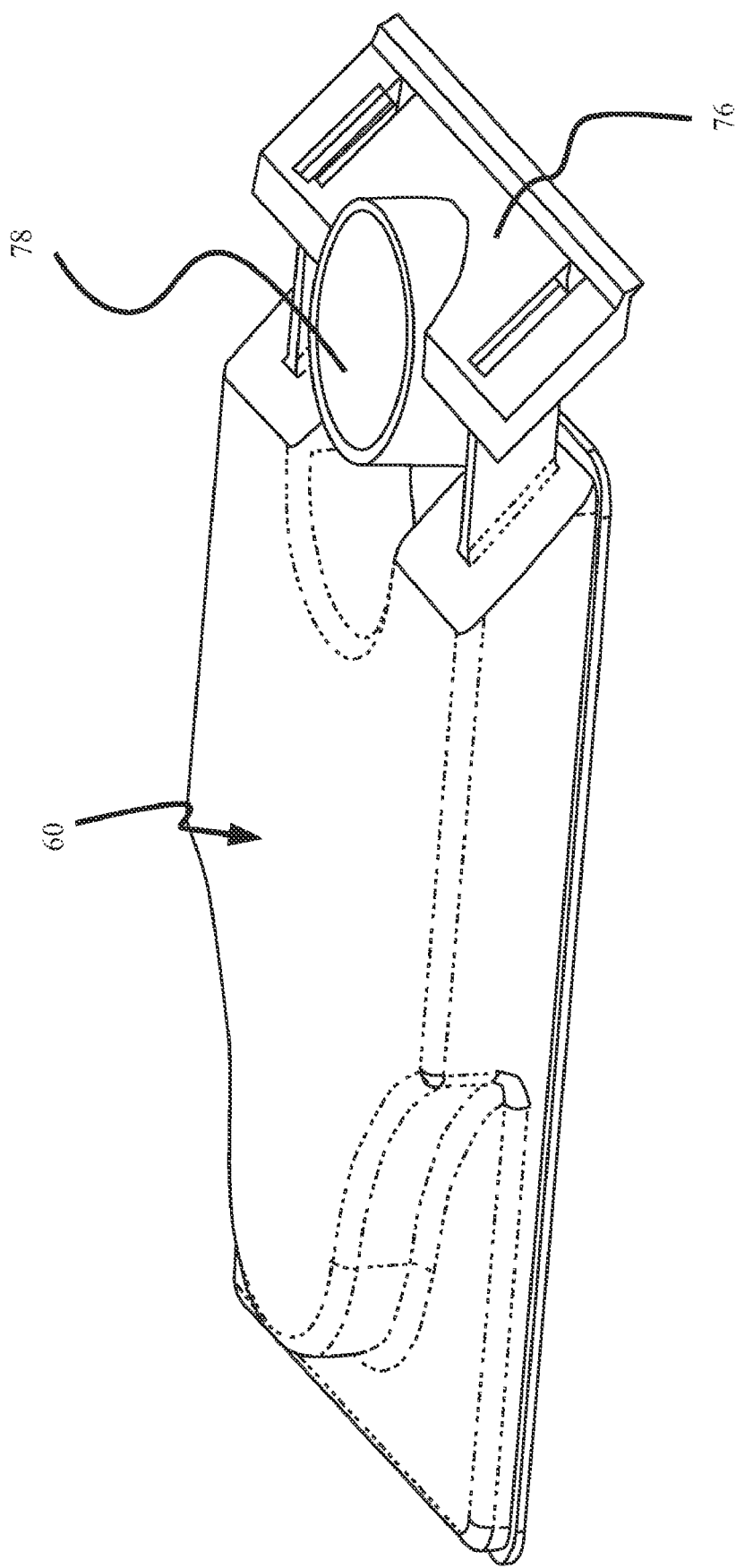
FIG. 6A is a top isometric view of the second embodiment of the inner component with a third configuration for support for the second cleaning element in the extended position.
Figure 6B:
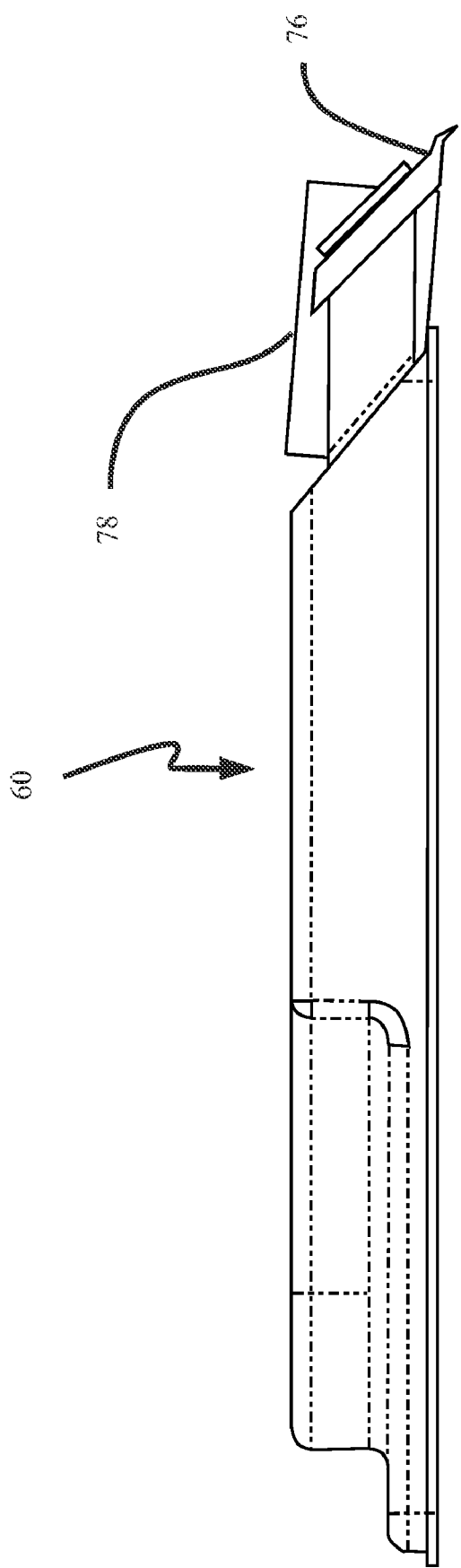
FIG. 6B is a side view of the second embodiment of the inner component with the third configuration for support of the second cleaning element in the extended position.
Figure 6C:
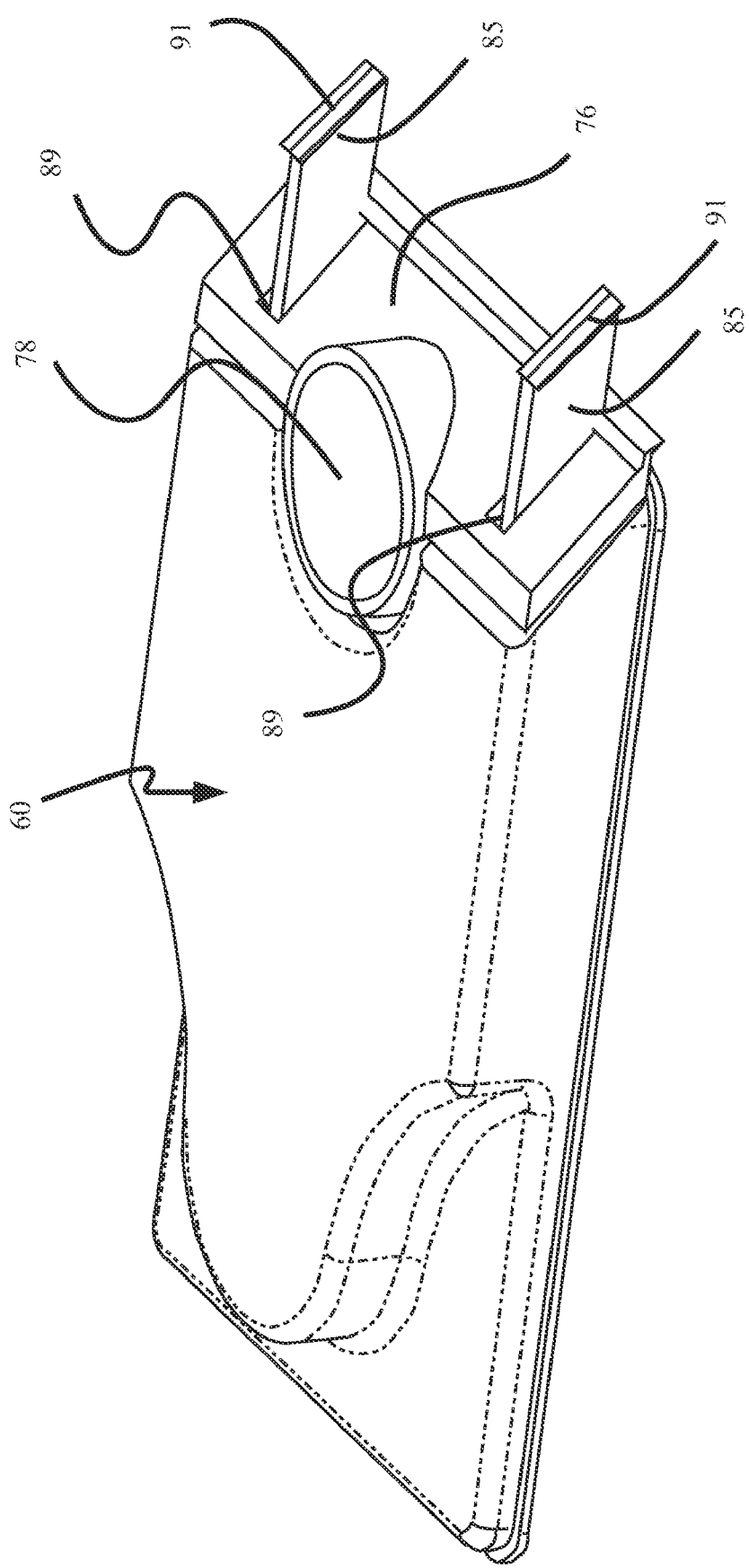
FIG. 6C is a top isometric view of the second embodiment of the inner component with a third configuration of the second cleaning element in the retracted position.
Figure 6D:
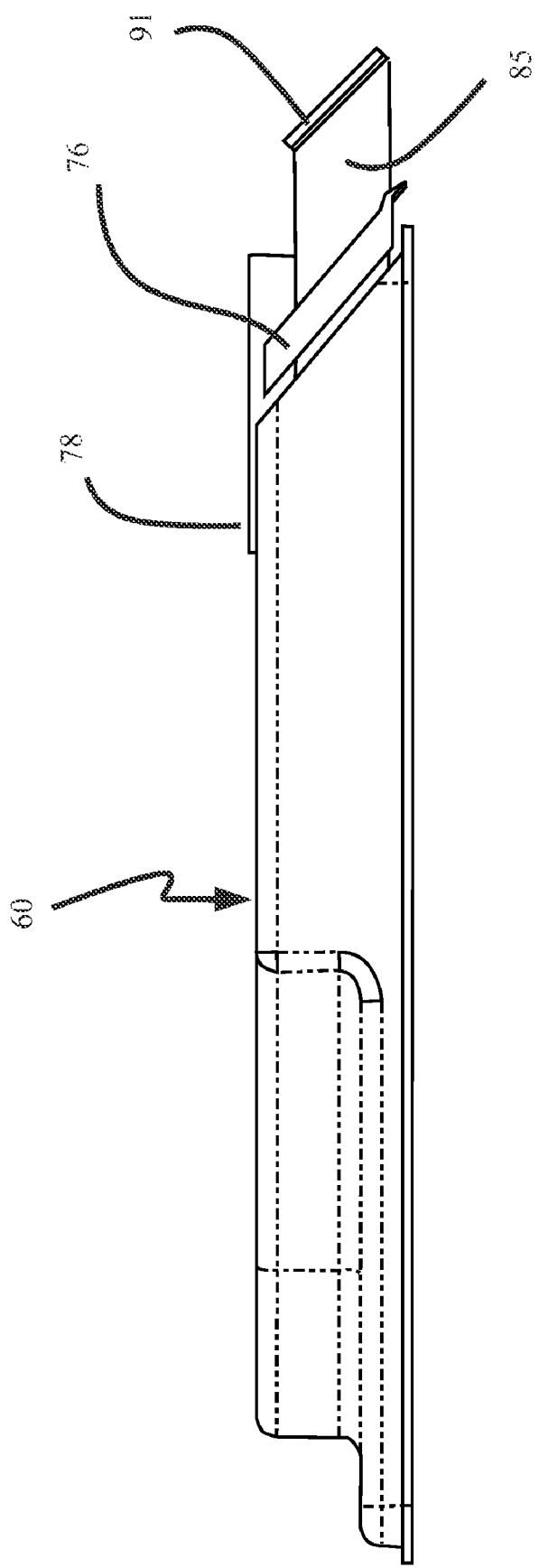
FIG. 6D is a side view of the second embodiment of the inner component with a third configuration of the second cleaning element in the retracted position.

An additional alternative for support of the extendible element of the second embodiment is shown in FIGS. 6A-6D. As in the version of the embodiment described with respect to FIGS. 5A-5F, a shuttle 78 containing magnet 86 is constrained in relief 74. As with the previously described version, blade 76 is carried by the shuttle extending from the front and sides of the shuttle wall. Extending arms 85 protrude from the body of the inner component and are received in slots 89 in the blade of the extendible element. FIGS. 6A and 6B show the shuttle in the extended position wherein the blade and shuttle are constrained by tabs 91 on the ends of arms 85 to prevent extraction of the extendible element from the inner component. As shown in FIGS. 6C and 6D with the shuttle in the retracted position the blade rests against inclined faces 61 on the body of the inner component with the shuttle urged against the rearward extent of the relief.

As shown in FIGS. 6C and 6D, in the retracted position the shuttle is constrained by the bottom wall of the relief and the blade is constrained by the inclined faces on the body to remove the blade from contact with the aquarium wall as with the prior embodiment. When extended as shown in FIGS. 6A and 6B the shuttle is drawn outward in the relief. The length of the extending arms 85 terminating in tabs 91 is dimensioned to allow a tipping axis 77 of the shuttle to extend beyond the forward edge 75 of the relief. Magnetic attraction between the external component and magnet 86 in the shuttle causes of the shuttle to rotate about the forward edge of the bottom of the relief to place the blade in contact with the aquarium wall. The thickness of the body wall remaining under the relief determines the amount of rotation available for the shuttle. The angle of tabs 91 on the extending arms additionally provides contact for the blade in the rotated position to urge contact with the aquarium wall.

Sizing of slots 89 in the blade and tabs 91 on the extending arms allows the arms to be flexed inward for clearance of the tabs into the slots for removal of the entire extendible element from the arms and inner component. This allows easy replacement for an alternative tool or for sharpening or replacement of the blade cutting edge.

Operation of the embodiment of FIGS. 6A-6D is identical to that described with respect to FIGS. 5E and 5F of the prior embodiment.

Figure 7:
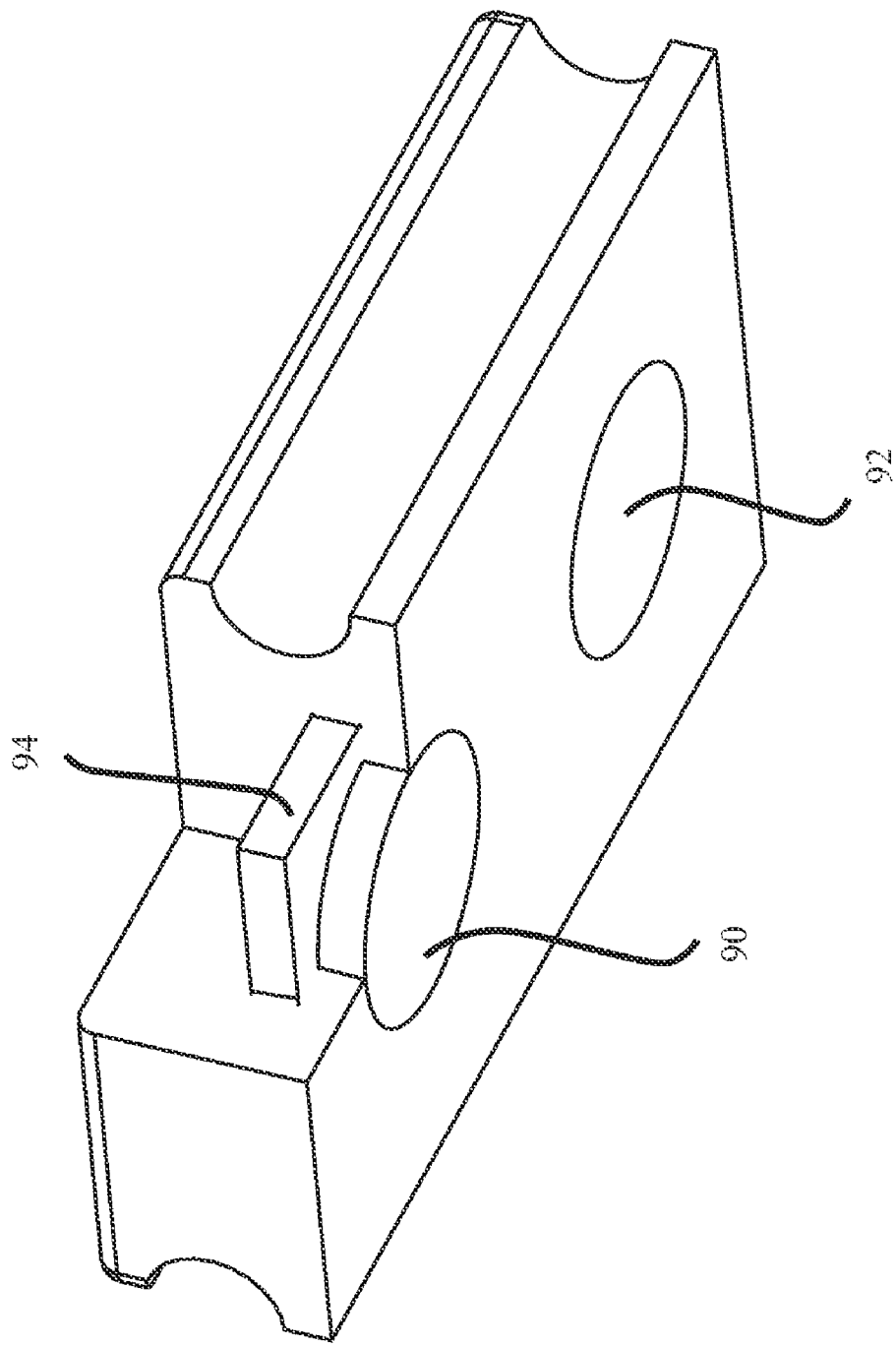
FIG. 7 is an isometric bottom view of a second outer component embodiment.

As shown in FIG. 7, a second embodiment of external component 88 for incorporates a first operating magnet 90 and, held in spaced relation within the handle, a second operating magnet 92. For the embodiment shown, an increaser plate 94 extends between the two magnets for amplification of the magnetic field created by the magnets. Positioning of the external component adjacent the internal component across the aquarium wall being cleaned places the operating magnets in proximity to the support magnets and extension magnet in the inner component.

Figure 8A:
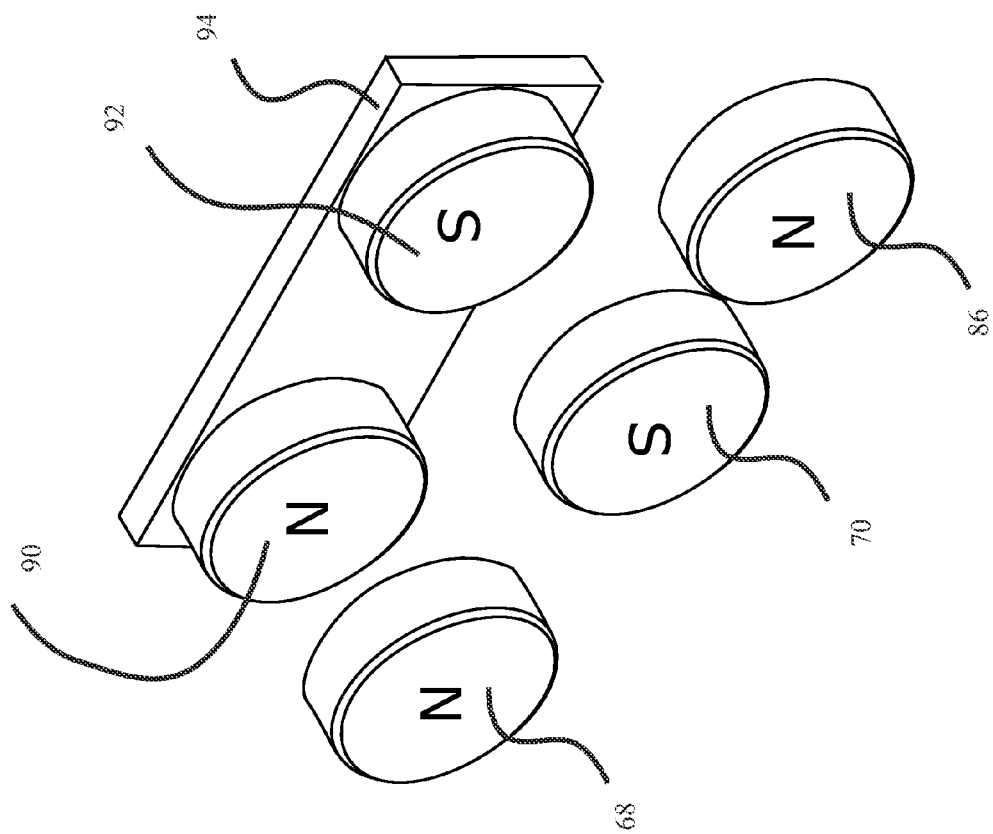
FIG. 8A is an isometric view of the magnetic elements of the second outer component embodiment with the second cleaning element in the retracted position.

FIG. 8A displays only the support magnets and the extension magnet as interrelated to the operating magnets in the second embodiment of the external component. Polls related to the visible surface of each magnet are shown. Opposite facing surfaces of each magnet relate to the opposite pole. In a first position shown in FIG. 8A, first operating magnet 90 is placed adjacent first support magnet 68 with opposite poles providing attraction to draw the inner component against the aquarium wall. Second operating magnet 92 held in spaced relation from the first operating magnet by the handle is placed adjacent second support magnet 70 both of which have an opposite orientation of polls from the first support magnet and first operating magnet, In this position the second operating magnet attracts the second support magnet to further increase the attraction between the external component and internal component. In this position the external component may be moved vigorously to employ the first cleaning element or abrasive pad all in the inner component with strong magnetic attraction between the inner and outer component. Also in this position extension magnet 86 which is oriented with polls opposite in direction to the second support magnet is attracted to the second support magnet drawing the shuttle of the extendible second cleaning element into the retracted position.

Figure 8B:
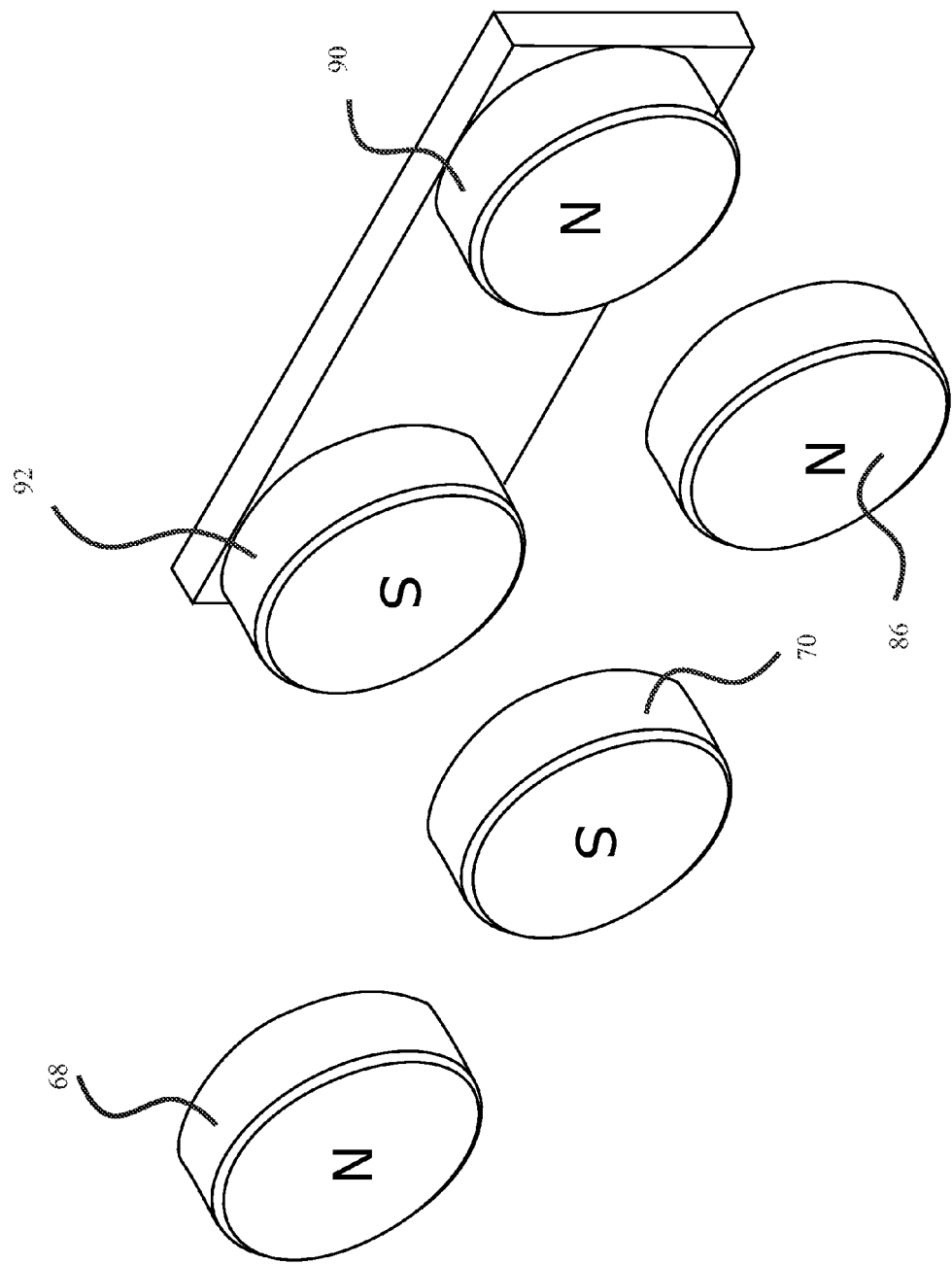
FIG. 8B is an isometric view of the magnetic elements of the second outer component embodiment with the second cleaning element in the extended position.

Rotating the external component to break the attraction between the first operating magnet and the first support magnet while maintaining attraction between the second operating magnet and second support magnet as shown in FIG. 8B retains the attraction between the inner and outer components but places the first operating magnet in a second position spaced linearly from the second support magnet to operate as a selection magnet. Extension magnet 86 is attracted to the first operating magnet resulting in extension of the shuttle to place the second cleaning element in contact with the aquarium inner surface.

Rotating the external component from the second position results in release of the magnetic attraction between the operating magnet and the extension magnet. Attraction between the extension magnet and the second support magnet then automatically retracts the shuttle removing the second cleaning element from the aquarium surface.

The handle arrangement of FIG. 7 with magnet placement while described with respect to an inner component as described in FIGS. 6A and 6B may be employed with any of the embodiments disclosed.

Figure 9B:
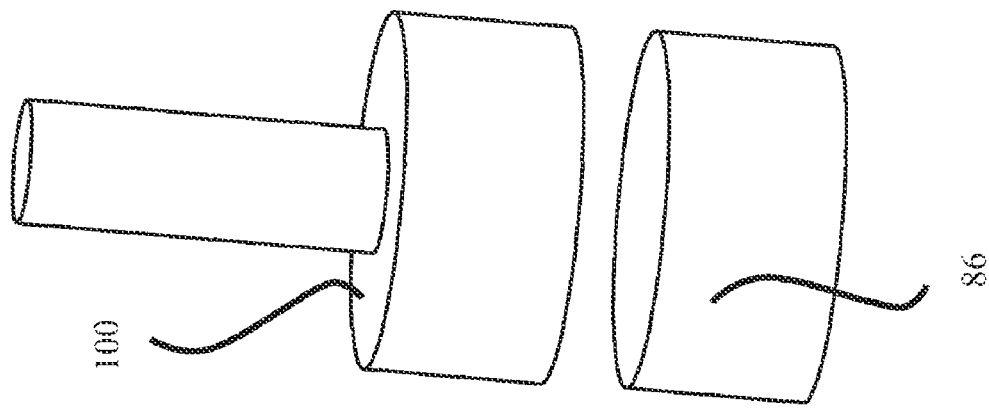
FIG. 9B is an isometric view of the magnetic elements of the third outer component embodiment with the second cleaning element in the extended position.
Figure 9B:
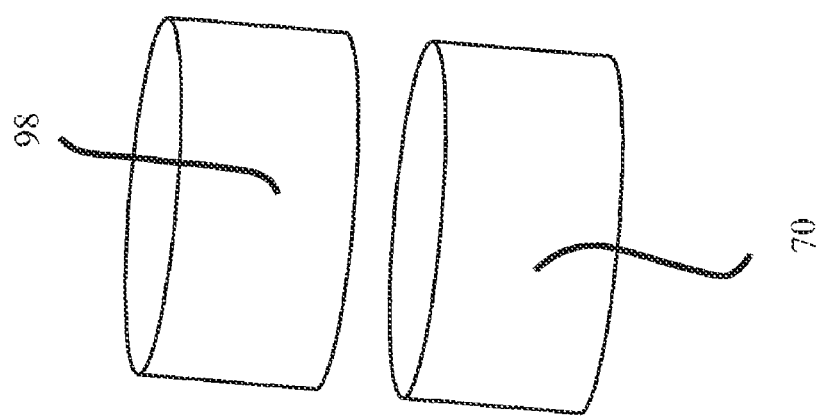
Figure 9B:
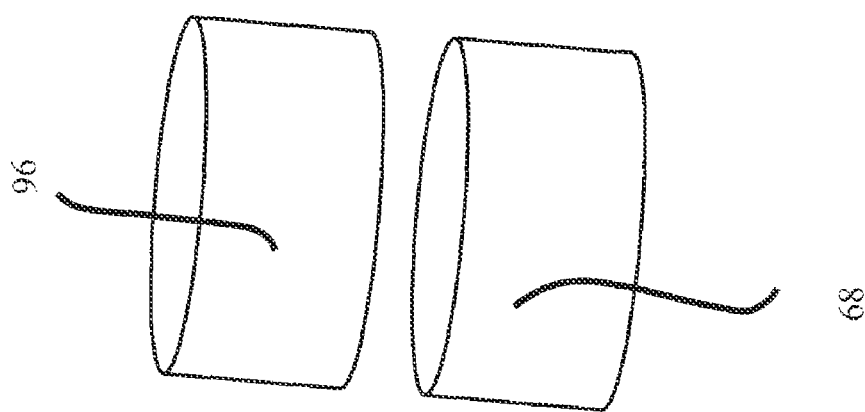

In an alternative embodiment shown in FIG. 9A, the external component incorporates two support magnets 96 and 98 and a single retractable operating or selection magnet 100. In this embodiment when operating magnet 100 is in the retracted position extension magnet 86 is attracted to the second support magnet 70 maintaining the shuttle in the retracted position. Extension of the operating magnet as shown in FIG. 9B creates an attraction between the operating magnet and the extension magnet resulting in extension of the shuttle to place the second cleaning element in contact with the aquarium surface. For the embodiment shown in the drawings the operating magnet is spring mounted to return to the retracted position.

Figure 10A:
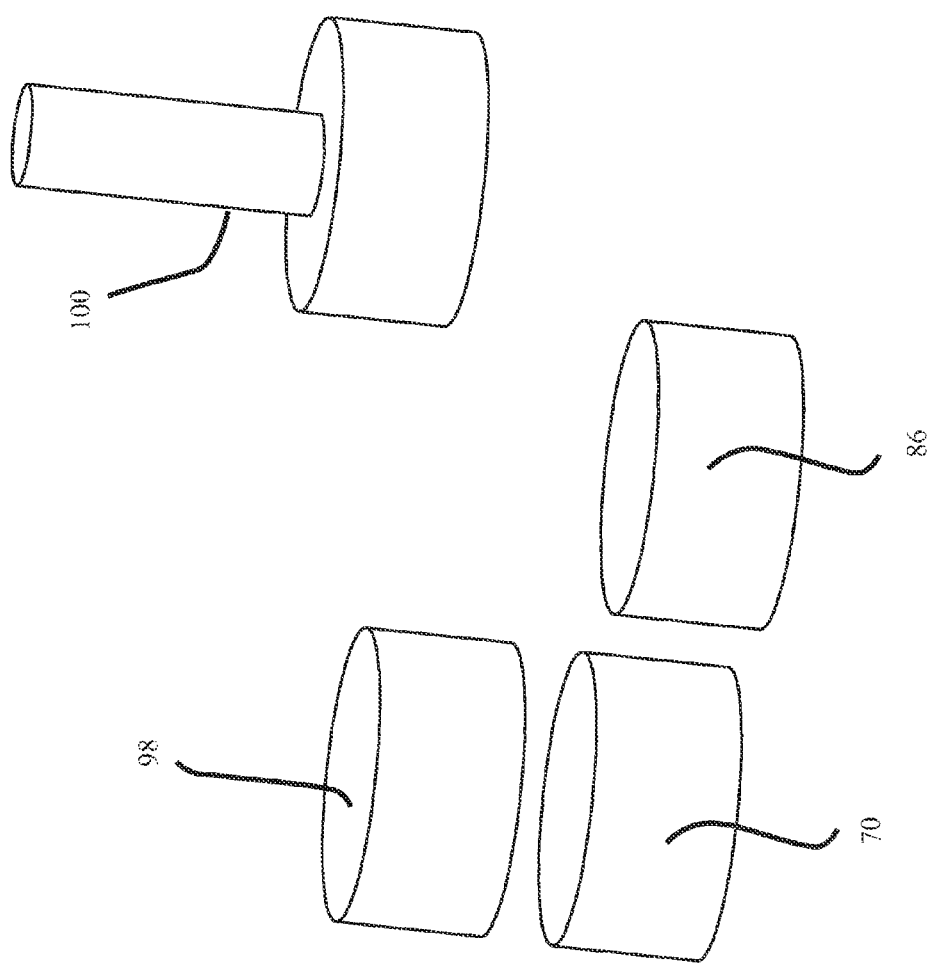
FIG. 10A is an isometric view of the magnetic elements of a fourth outer component embodiment with the second cleaning element in the retracted position.
Figure 10B:
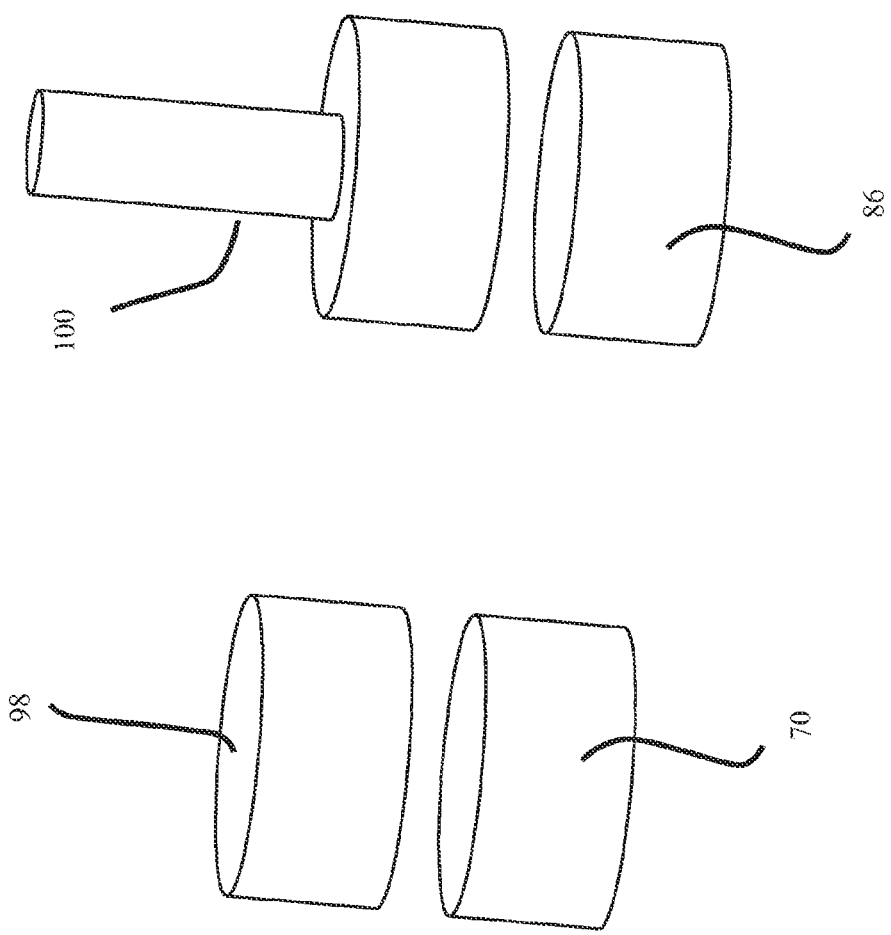
FIG. 10B is an isometric view of the magnetic elements of the fourth outer component embodiment with the second cleaning element in the extended position.

In yet other alternative embodiments, as shown for example in FIGS. 10A and 10B, the external and internal components each have a single support magnet to maintain attraction between the inner and outer component with a single operating magnet adapted for engagement of the extension magnet.

Returning to FIG. 4A, the inner component of the present invention incorporates buoyancy or ballast elements to provide orientation of the inner component when not under the influence of the external component. To avoid contamination of the operating mechanism for the extendible second cleaning element or disturbing the bottom and environment of the aquarium, it is preferable to maintain an orientation of the inner component which prevents contact of the extendible element with the sandy bottom of the aquarium. In FIG. 4A case 62 incorporates a volume reducing contour 102 which reduces buoyancy of a first portion 104 of the inner component opposite the extendible second cleaning element. The larger buoyant volume of second portion 106 of the inner component proximate the extendible second cleaning element results in the floating orientation of the internal component with the extendible second cleaning element upward.

In alternative embodiments, weights or other ballast are incorporated in the first portion of the inner component to provide orientation for the buoyant component. In each embodiment the inner component is substantially neutrally buoyant resulting in a vertical floating orientation within the aquarium.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An aquarium wall cleaning device comprising:
   an outer component having
      a handle;
      a first magnetic element carried within the handle;
      at least one selection magnet carried within the handle;
   an inner component having
      a body having an associated first cleaning element;
      a support magnet carried within the body for operable engagement with the first magnetic element in the handle drawing the body into contact with an inner surface of an aquarium wall to be cleaned;
      a movable element having an associated second cleaning element and supported by the body with at least one extension magnet carried therein, movable from a first position to a second position responsive to attraction by the at least one extension magnet to the at least one selection magnet in the handle.

2. The aquarium wall cleaning device as defined in claim 1 wherein the first cleaning element comprises a cleaning pad.

3. The aquarium wall cleaning device as defined in claim 1 wherein the second cleaning element comprises a scraper.

4. The aquarium wall cleaning device as defined in claim 1 wherein the movable element is pivotally mounted in the body having a first portion and a second portion and wherein the at least one magnetic element comprises a first magnet carried in the first portion and a second magnet carried in the second portion, said selection magnet positionable from a first position attracting the at least one extension magnet and placing the movable element in said first position, said selection magnet positionable to a second position attracting the at least one extension magnet and rotating the movable element to said second position engaging said second cleaning element with the aquarium wall.

5. The aquarium wall cleaning device as defined in claim 1 wherein the movable element is pivotally mounted in the body having a first portion and a second portion and wherein the at least one magnetic element comprises an extension magnet carried within a channel in the movable element and freely slidable within the channel between said first portion and said second portion responsive to said selection magnet to place the movable element in said first position and said second position respectively.

6. The aquarium wall cleaning device as defined in claim 1 wherein the movable element comprises a shuttle reciprocally mounted within the body for movement from a first retracted position to a second extended position, said shuttle containing said at least one magnetic element, and wherein placement of the selection magnet proximate the at least one magnetic element causes said shuttle to reciprocate from said first retracted position to said second extended position.

7. The aquarium wall cleaning device as defined in claim 6 wherein displacement of said selection magnet from the at least one magnetic element causes said shuttle to reciprocate from said second extended position to said first retracted position by attraction of said at least one magnetic element to said support magnet.

8. The aquarium wall cleaning device as defined in claim 1 wherein the body incorporates orienting buoyancy to maintain the second cleaning element in an upward orientation when not magnetically attracted to the outer component.

9. The aquarium wall cleaning device as defined in claim 1 wherein the at least one selection magnet is slidable within the handle from a first position to a second position for attraction of the movable element from the first position to the second position.

10. The aquarium wall cleaning device as defined in claim 1 wherein the at least one selection magnet is extendible from a first retracted position to a second extended position for attraction of the movable element from the first position to the second position.

11. The aquarium wall cleaning device as defined in claim 1 wherein the at least one selection magnet is rotated with the handle for attraction of the movable element from the first position to the second position.

12. The aquarium wall cleaning device as defined in claim 9 further comprising a supplemental magnetic element in the handle for attraction of a supplemental support magnet in the body.

13. The aquarium wall cleaning device as defined in claim 10 further comprising a supplemental magnetic element in the handle for attraction of a supplemental support magnet in the body.

14. The aquarium wall cleaning device as defined in claim 11 further comprising a supplemental magnetic element in the handle for attraction of a supplemental support magnet in the body.

15. A method for aquarium wall cleaning comprising the steps of:
 providing an inner component having a body with a first portion having an associated first cleaning element, a support magnet carried in the body, a movable element having an associated second cleaning element and supported by the body with at least one extension magnet carried therein, movable from a first position to a second position responsive to attraction of the at least one extension magnet, the second portion having an associated second cleaning element placed in contact with the aquarium wall in the second position;
 providing an outer component having a handle with at least one magnetic element and a selection magnet carried within the handle;
 placing the outer component proximate the inner component on opposite sides of a glass wall to engage the first magnetic element and support magnet to draw the first cleaning element against the glass;
 moving the selection magnet for attraction of the at least one extension magnet from the first position to the second position for engaging the second cleaning element in contact with the glass.

16. The method as defined in claim 15 wherein the step of moving the selection magnet comprises sliding the selection magnet from a first position to a second position within the handle.

17. The method as defined in claim 15 wherein the step of moving the selection magnet comprises rotating the handle about the magnetic element to position the selection magnet from a first position distal the second cleaning element to a second position proximate the second cleaning element.

18. The method as defined in claim 15 wherein the step of moving the selection magnet comprises extending the selection magnet from a first retracted position to a second extended position.

19. The method as defined in claim 15 further comprising the step of removing the selection magnet to break attraction with the at least one extension magnet to return the extension magnet to the first position by attraction to the support magnet.

\* \* \* \* \*